US009585425B2

(12) United States Patent
Berchten et al.

(10) Patent No.: US 9,585,425 B2
(45) Date of Patent: Mar. 7, 2017

(54) PORTABLE AIRBAG FOR PEOPLE

(75) Inventors: Yan Berchten, Montreux (CH); Pierre-Yves Guernier, Clarens (CH)

(73) Assignee: Mammut Sports Group AG, Seon (CH)

(*) Notice: Subject to any disclaimer, the term of this patent is extended or adjusted under 35 U.S.C. 154(b) by 978 days.

(21) Appl. No.: 13/881,490

(22) PCT Filed: Oct. 26, 2011

(86) PCT No.: PCT/EP2011/068749
§ 371 (c)(1),
(2), (4) Date: Jul. 15, 2013

(87) PCT Pub. No.: WO2012/055913
PCT Pub. Date: May 3, 2012

(65) Prior Publication Data

US 2013/0283510 A1 Oct. 31, 2013

(30) Foreign Application Priority Data

Oct. 26, 2010 (CH) ........................................ 1772/10
Jul. 20, 2011 (CH) ........................................ 1217/11

(51) Int. Cl.

| | |
|---|---|
| ***B60R 21/16*** | (2006.01) |
| ***A41D 13/00*** | (2006.01) |
| ***A62B 33/00*** | (2006.01) |
| *A45F 3/04* | (2006.01) |
| *B63C 9/18* | (2006.01) |
| *B60C 29/00* | (2006.01) |
| *B63C 9/00* | (2006.01) |

(52) U.S. Cl.
CPC .......... *A41D 13/0002* (2013.01); *A62B 33/00* (2013.01); *A45F 3/04* (2013.01); *B63C 9/18* (2013.01); *B63C 9/24* (2013.01); *B63C 2009/0076* (2013.01)

(58) Field of Classification Search
CPC .............................. B60R 21/261; B60R 21/34
USPC ...... 280/728.2, 743.1, 743.2; 441/80, 88, 98
See application file for complete search history.

(56) References Cited

U.S. PATENT DOCUMENTS

| | | | | |
|---|---|---|---|---|
| 4,635,754 A * | 1/1987 | Aschauer | ............... | A62B 99/00 182/3 |
| 6,158,380 A | 12/2000 | Aschauer et al. | | |
| 6,220,909 B1 | 4/2001 | Aschauer et al. | | |
| 6,270,386 B1 * | 8/2001 | Visocekas | ............ | A41D 13/018 441/104 |

(Continued)

FOREIGN PATENT DOCUMENTS

| | | |
|---|---|---|
| DE | 1268999 | 5/1968 |
| DE | 20106766 U1 | 9/2001 |

(Continued)

*Primary Examiner* — Toan To
(74) *Attorney, Agent, or Firm* — The Webb Law Firm

(57) ABSTRACT

The present invention relates to a portable airbag system for people, comprising a support intended to be worn by a user, and an airbag device comprising at least one inflatable bag having at least one central part (2*a*) designed to be disposed behind the head of a user after triggering. The airbag device is assembled in a cover or bag part forming a unit configured to be disposed entirely on the back of a user before deploying, the airbag device being fixed by means of a fixing device such as to be removable and separable from the support.

18 Claims, 17 Drawing Sheets

(56) References Cited

U.S. PATENT DOCUMENTS

Figure 1A:
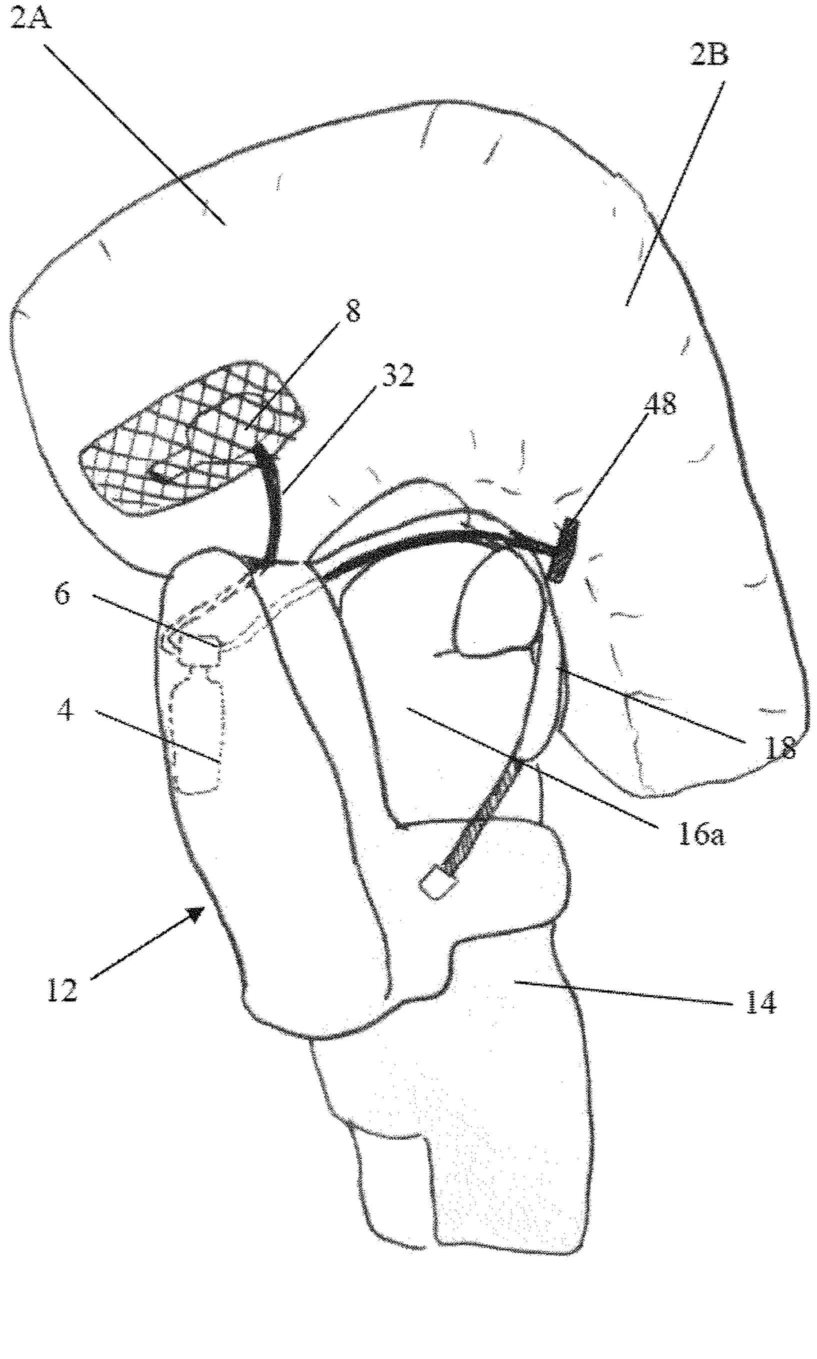

| | | | | |
|---|---|---|---|---|
| 2004/0244100 | A1* | 12/2004 | Haddacks .............. | A62B 33/00 2/463 |
| 2005/0130516 | A1 | 6/2005 | Courtney | |
| 2006/0107952 | A1* | 5/2006 | Schlosser ............. | A41D 13/018 128/202.19 |
| 2007/0056500 | A1* | 3/2007 | Beck ...................... | A62B 33/00 116/210 |
| 2008/0257643 | A1* | 10/2008 | Weinel ................... | A62B 33/00 182/18 |
| 2010/0112880 | A1* | 5/2010 | Aschauer ............. | A63B 29/021 441/80 |
| 2010/0184343 | A1* | 7/2010 | Paynton ................. | A62B 33/00 441/90 |
| 2014/0263517 | A1* | 9/2014 | Redli ........................ | A45F 3/04 224/576 |
| 2015/0228174 | A1* | 8/2015 | Bauer ..................... | H04W 4/02 340/539.13 |
| 2016/0000158 | A1* | 1/2016 | Davis ................... | A41D 13/018 2/455 |
| 2016/0016044 | A1* | 1/2016 | Rose ...................... | A63B 29/02 441/114 |

FOREIGN PATENT DOCUMENTS

| | | | |
|---|---|---|---|
| EP | 0957994 | B1 | 12/2001 |
| EP | 1935457 | A1 | 6/2008 |
| GB | 2162129 | A | 1/1986 |
| WO | 0108114 | A2 | 2/2001 |

* cited by examiner

IG. 4b

PORTABLE AIRBAG FOR PEOPLE

CROSS-REFERENCE TO RELATED APPLICATIONS

This application is the United States national phase under 35 U.S.C. §371 of International Application No. PCT/EP2011/068749 filed Oct. 26, 2011, entitled "Portable Airbag for People", and claims priority under 35 U.S.C. §119 (a)-(d) to Switzerland Patent Application Nos. 01772/10 filed on Oct. 26, 2010 and 01217/11 filed on Jul. 20, 2011 in the Switzerland Intellectual Property Office, the disclosures of which are hereby incorporated by reference in their entirety.

BACKGROUND OF THE INVENTION

Field of the Invention

The present invention concerns a portable airbag system for people, in particular for the protection of people in the case of avalanches or falls.

Description of Related Art

Airbags for the protection of people during avalanches are described in the patent applications: DE 201 06 766U1; GB-A-2 162 129; DE 12 68 999B; US 2005/130516; U.S. Pat. No. 4,635,754; U.S. Pat. No. 6,158,380; EP0957994B1; U.S. Pat. No. 6,220,909. Some of the known systems of personal airbags have an inflatable bag which deploys around the neck and the head and in front on the thorax of the user so as to protect the head and the ribcage of the user. During an avalanche, such a configuration also permits a space to be created in front of the user, allowing him to breathe when he is buried in the snow. So as to be able to deploy towards the front, the known airbags have a relatively complex storage system with parts disposed in shoulder straps and also on the back of the user, necessitating great modifications on the shoulder straps and the whole of the backpack, able to bring about a lack of comfort or a shape which is not very ergonomic, and also complications in the manufacture of the product. The configuration limits the possibilities of combining the airbag with other elements which are useful to the walker, mountaineer or worker, the shoulder straps and other parts containing the airbag having to be left free and exposed towards the exterior. Also, the combination of the airbag with backpacks of different shapes and sizes, a jacket, or other equipment, is very limited.

For the deployment of the airbag, there can be an automatic triggering system or a manual or semi-automatic triggering system. The selected triggering system will depend on the application, an automatic system being more difficult to implement in the majority of cases because it necessitates the measurement of well defined parameters to define with a great level of safety the moment of triggering of the airbag. The simplest semi-automatic systems are those comprising a cord which is connected to a support and which pulls on a triggering arrangement when the user falls. However, other triggering means comprising an electronic triggering coupled to an inertia sensor (shock sensor), a remote control button, or a pressure sensor are also able to be envisaged.

In the case of avalanches, the development of the avalanche takes a certain time and the user normally has at least a few seconds for triggering his airbag. He must, nevertheless, react relatively quickly when he receives the first signs of the development of an avalanche, and must actuate the triggering of the airbag in a space of time which can be in the order of 1 to 3 seconds. In conventional airbags, it is known to have a flexible cord, with a handle at its end which the user will pull, the cord being connected to a triggering device mounted on a gas generator, which can be a bottle of compressed gas or a pyrotechnic device connected to the airbag. One of the problems of this known system, in a situation of stress or panic, is to ensure that the user can find the handle sufficiently quickly. By being attached to a flexible cord, the handle can move by the movement of the user and can be situated in an indeterminate position in its radius of movement. Another problem is the risk of unintentional triggering of the airbag if the handle hooks onto an external object, or by a false movement or false manipulation by the user, or else during the storage or stowing of the airbag system, the handle being exposed.

Known airbag systems user a gas generator coupled to a venturi system which is configured to draw exterior air which is added to the gas supplied by the gas generator to fill the inflatable bag. This system advantageously permits there to be a gas generator with reduced volume and weight for the filling of a bag having a relatively high volume, in particular 2 to 3 times the volume provided by the gas generator itself. For the good functioning of the venturi system and hence of the inflation of the back, it is important that the venturi system is exposed to the air. In known systems, the venturi system is mounted directly on the bag, the venturi system comprising a case in two parts, one part being mounted in the interior of the bag and the other on the exterior. The interface between the two parts is in the form of flanges which tightens the fabric of the airbag over the entire periphery of the hole formed in the bag for the mounting of the venturi system. Before triggering of the airbag system, the venturi is stored with the bag inside a protective cover. After triggering, and in a first stage of inflation of the bag following the gas supplied by the gas generator, the venturi system and the bag deploy outside of the cover and are exposed to the exterior air, permitting the venturi system to freely draw the air from the exterior. The venturi system is nevertheless directly exposed to the exterior and the inlet openings can be plugged by snow blocking partially or totally the aspiration of air from the exterior and causing an insufficient or partial inflation of the bag. Moreover, the part mounted on the exterior of the airbag is exposed to the shocks because it represents a protuberance which is not protected once the airbag is inflated. The manufacture of a venturi and its mounting in two parts in the interior and on the exterior of the bag is also relatively costly and weakens the bag at the level of the interface between the venturi system and the bag, leading to the risks of rupture and of leaks.

A system of percussion triggering of a bottle or cartridge of compressed gas comprises a projectile point which pierces a part of the breakable wall of the cartridge. The gas cartridge is typically screwed on the triggering device. The triggering device can have been triggered, for example by having pulled on the triggering handle, and consequently the point can be in a deployed position before mounting of a cartridge on the triggering system. If the user does not check that the triggering system is in its withdrawal position, i.e. not deployed, he can perforate the cartridge when he mounts it on the triggering device. The perforation of a gas cartridge before it is completely mounted on the triggering device is dangerous for the user, the inflation of the airbag in such a situation also being dangerous.

The known triggering systems are also relatively heavy and cumbersome. The weight and overall dimensions are important elements for all mountain equipment.

Known airbag systems offer the user the possibility of changer a part of the support via a zip fastener to modify the capacity of the support. It is, in fact, of interest to a user having an airbag system to be able to use this on supports permitting more or less equipment to be taken, or being more or less cumbersome.

Several documents state the possibility of integrating an avalanche airbag technology on several types of supports. It is known to adapt an airbag system on varied supports on manufacture or to produce a support which can be modifiable. The complex part of the operation, namely the fixing of the airbag system on the main support, is carried out by the manufacturer who can manage this operation requiring qualified employees. The airbag systems on the market typically require more than 30 minutes of monitoring and manipulation to assemble and check the good assembly of the support and of the airbag system. These systems are not suitable for a manipulation by the user.

SUMMARY OF THE INVENTION

An aim of the invention is to provide a portable airbag system for people which offers a great flexibility in the choice of the support and which deploys in a safe and reliable manner under all circumstances to provide a good protection to a user, in particular of his head and the upper part of the thorax.

It is advantageous to provide a portable airbag system which offers a flexibility of configuration with the support, able to be manipulated outside the factory by non-professionals.

It is advantageous to provide an airbag system with a manual or semi-automatic triggering system which permits a rapid and safe deployment for the user by means of an ergonomic and practical handle, permitting any unintentional triggering to be prevented.

It is advantageous to provide an airbag system with a gas generator and a robust venturi system for the aspiration of air which permits a reliable and safe deployment of the airbag and which is economical to manufacture and assemble.

It is advantageous to provide an airbag system which is very compact and light before deployment and which permits a mounting on different systems and personal equipment such as a backpack, a jacket, a harness with a great flexibility, i.e. easily adaptable to different systems in an economical, safe and reliable manner.

It is advantageous to provide an airbag system being able to be fixed easily and in total security on varied supports by the user, and it is advantageous to provide supports intended for this purpose.

It is advantageous to provide an airbag system which is easily resettable and which eliminates the risk of poor manipulation and in particular the unintentional piercing of the gas cartridge during its mounting on the triggering device.

It is advantageous to provide an airbag system with a very compact and light gas generator and triggering system.

Aims of the invention are realized by a portable airbag system for people, as described herein.

Aims of the invention are also realized by an airbag device according to different claims.

Aims of the invention are also realized by a support intended to be worn by a user for a portable airbag system for people according to another claim.

An airbag device for a portable system for people comprises at least one inflatable balloon, a gas generator, and a venturi system. The system is connectable on the one hand to the gas generator and on the other hand to the inflatable balloon. The inflatable balloon is arranged in a cover comprising fixing elements provided to be connected in a removable manner with complementary elements of the portable system for people. In addition, the cover preferably comprises a closure of the Velcro type or zip type or press-studs type intended to permit the cover containing at least the inflatable balloon to be fixed on the support of the portable system for people by a closure of the Velcro type or of the zip type or of the press-studs type provided thereon, such that once it is fixed, the closure of the cover is open. Preferably, but not necessarily, the venturi system has an outlet inserted in an opening of the inflatable balloon, the venturi system comprising an aspiration part with openings for the passage of exterior air drawn by the venturi system during its deployment, and/or the venturi system is connected through the cover or disposed in the cover with the inflatable balloon.

In the present document, a portable airbag system for people is described, comprising a support intended to be worn by a user, and an airbag device comprising at least one inflatable bag having at least one central part configured to be disposed behind the head of a user after triggering.

In an aspect of the invention, the airbag device is assembled in a cover or bag part forming a unit configured to be disposed entirely on the back of a user before deploying, the airbag device being fixed by means of a fixing device such as to be removable and separable from the support. Such a configuration permits one to have an airbag device forming a compact unit separable from the support carried by the user, but which can protect the head and the thorax of the user. A user can assemble the airbag device on different supports, for example backpacks of different capacity or shapes, as a function of the activity which he wishes to undertake or of what he wishes to transport. A great flexibility and modularity are thus offered to the user.

Advantageously, the portable airbag system for people according to the invention offers the possibility of transferring the airbag device from one support to another easily by a non-professional user, whilst minimizing the risk of a false manipulation and of malfunction to ensure that the airbag system deploys in a safe and reliable manner under all circumstances and provides a good protection of the head and thorax of a user. The support can also be used without an airbag device in situations where there is no danger of avalanches.

The fixing device can comprise a zip fastener or a closure of the Velcro type on the support and a complementary zip fastener, respectively or a closure of the Velcro type, on the cover or bag part of the airbag device. The fixing device can also be formed by a row of press-studs. The zip fastener or the closure of the Velcro type allows the cover containing the inflatable balloon to be fixed on the support by the zip fastener, respectively by the closure of the Velcro type of the cover such that once it is fixed, the zip fastener, respectively the closure of the Velcro type of the cover is open.

In an embodiment, the support comprises a backpack comprising a reinforced area fixed on an edging of the backpack, the reinforced area comprising fasteners configured to be attached in a removable manner to fixing elements integral with the inflatable balloon. The fixing elements can be advantageously in a T-shape and the fasteners in the form of complementary slots.

In an embodiment in the same sense, the support comprises a backpack comprising a conventional edging of a backpack, i.e. normally with a band of fabric (reinforcement, edge binding) which covers the layers of the backpack which are connected/stitched to the edge of the dorsal wall of the backpack. According to this embodiment, individual fasteners, preferably four fasteners spaced along the upper part of the edging, configured to be attached in a removable manner to fixing elements integral with the inflatable balloon, are fixed on or in the edging, i.e. for example by using the band of fabric which covers the layers. In this way, standard models of backpacks can be equipped by such fasteners and sold without a portable airbag system for people, but a portable airbag for people can be added and integrated easily.

This permits the majority of backpacks to be transformed into a backpack able to receive an avalanche airbag due on the one hand to an extremely simple, rapid and reliable airbag system, and on the other hand due to the use of a certain area of a backpack. In fact, the majority of backpacks are composed of a back, of optional internal separations and of a cover (front panel), these being assembled all together by a seam for the constitution of the backpack. This seam is reinforced by a reinforcement (edge binding) which comes to sandwich them with a new seam above. The idea of the invention is to start from this state of construction to fix a reinforced area or individual webbing loops which will support the airbag. The advantages of these aspects of the invention are: gain in weight with respect to the other systems; reduction of production costs, because no modification of the bag; accounting of the system with the majority of backpacks.

The portable airbag system for people can therefore comprise a backpack comprising at least one fixing system for the airbag device, and an airbag device comprising at least one inflatable bag having at least one inflation system, characterized in that the fixing system is directly sewn on the conventional edging (assembly banding) of a conventional backpack. The fixing system can be composed, for example, of webbing loops which are picked up directly in the seam of the assembly edging of a conventional backpack. The fixing system can be composed, for example, of a reinforced piece of fabric with eyelets, which is directly picked up in the seam of the assembly edging of a conventional backpack.

Such a conventional backpack, to be adapted and provided with a portable airbag system which can be removed if one does not need it, normally must be equipped with at least one following means or combination of supplementary means:

- a slot configured to permit the deployment of the inflatable balloon, this slot being closed by an openable closure under tension of the “Velcro” type or a zip fastener having a breakage area defined and calibrated to open in the case of inflation of the balloon. This slot configured to permit the deployment of the inflatable balloon can be a supplementary closure to the conventional closure of the backpack in the upper region of the backpack. Normally, such a supplementary closure is located in parallel to the conventional closure and offset with respect thereto towards the back of the wearer. Otherwise, the conventional closure can be modified such that this function is realized by it; and/or
- a means for attaching the removable bag of the portable airbag system in the backpack and a means for readily locating it in the backpack and supporting towards the bottom. Such a means can be one or several bands which pass beneath the removable bag of the portable airbag system, preventing that at the moment of triggering the portable air bag system could descend inside the backpack. Such a means can be attached to the conventional edging and/or to the rear part of the backpack, or else there can be supplementary fasteners or webbing loops for attaching one or more bands or such a support system; in addition or as an alternative, there can be “Velcro” closures or zip fasteners attached to the backpack corresponding to the closure of the removable bag of the portable airbag system so as to permit the attaching thereof by these means to the backpack. In this way, the attachment means forms a supplementary open or closed compartment in the backpack; and/or
- a pocket or a means of attachment for the gas bottle or for other elements of the portable airbag system; and/or
- a passage for the duct/the tube or the cable of the airbag system towards the shoulder straps. This passage preferably terminates directly at a channel in the shoulder strap for the cable or the duct; and/or
- means for attaching the duct/the tube or the cable of the airbag system to a shoulder strap or else an at least partially openable channel (Velcro or zip fastener) in the shoulder strap, for placing therein the tube, the cable of the airbag system. In addition, there can be a supplementary openable pocket (zip fastener, Velcro), associated with the channel, for the handle for storing and concealing it during periods in which one does not have need of the system. In addition, there can be means for attaching the handle of the airbag system; and/or
- a reinforced loop for the belt, for example of aluminium type;
- crotch straps.

According to an embodiment, the support is in the form of a backpack, the backpack comprising a slot configured to permit the deployment of the inflatable balloon, this slot being closed by an openable closure under tension of the “Velcro” type or a zip fastener having a breaking area defined and calibrated to open in the case of inflation of the balloon. According to another embodiment, the support can be a jacket, the jacket comprising, like the backpack, a slot configured to permit the deployment of the inflatable balloon.

In an aspect of the invention, the airbag device comprises a gas generator, and a venturi system connectable on the one hand to the gas generator and on the other hand having an outlet inserted in an opening of the inflatable balloon. The venturi system comprises an aspiration part with openings for the passage of exterior air drawn by the venturi system during deployment of the airbag, the outlet being in the form of a tube is fixed by clamping on a tubular excrescence of the inflatable bag, the body of the venturi system being disposed in a manner lying against the surface of the inflatable bag.

In an aspect of the invention, the airbag system can comprise a triggering handle device comprising a handle part connected to a cable, or another means of interaction such as a gas or liquid duct, connected to a triggering system of the airbag. In an advantageous embodiment, the cable (or the other means) is fixed to a pivoting body mounted in a pivoting manner to the handle part, the handle device further comprising a locking device configured to lock the handle part in a transverse position to the cable. The handle device can comprise a stiffening tube extending from the pivotable body for a certain length around the cable. An advantage of locking the handle part in a transverse position to the cable is the fact of favouring the introduction of the handle through the opening between the interior of the backpack and the shoulder strap.

In an aspect of the invention, the airbag device comprises a triggering device for the triggering of a gas generator, the triggering device comprising a triggering point with a spring for pushing the point, the spring being in compression before triggering and retained by a trigger element. The trigger element comprises a retention member engaged in a removable blocking element, the blocking element being retained by the retention element in a position permitting a gas generator to be mounted to the triggering device, and when the trigger element has been moved to a deployment position, the retention member releases the blocking element which is configured to be moved in a position blocking the assembly of the gas generator to the triggering device. One thus prevents mounting a gas generator if the triggering point is in triggered position.

The airbag device can comprise a triggering point with a spring to push the point, the point being reset by a tool configured to push the blocking element then reset the triggering point. This advantageously permits the avoidance of mounting a gas generator if the triggering point is in triggered position.

In an aspect of the invention, an airbag device is described comprising a triggering device for the triggering of a gas generator, the device comprising a triggering point with a spring for pushing the point, the spring being in compression before triggering and retained by a trigger element, the triggering element comprising lateral passages configured to prevent a jack effect during the percussion of the gas generator. This advantageously permits limiting the weight and the overall dimensions of the triggering device.

In an aspect of the invention, an airbag device is described comprising a triggering device for the triggering of a gas generator, the triggering device comprising a metallic body with two parallel chambers. These two parallel chambers permit the interaction of the various elements, because the elements are parallel. The interaction of the cable of the trigger, the ball of the triggering arrangement and the blocking element is such that the trigger element connected to the cable permits, in the upper position, the triggering of the triggering arrangement by freeing the ball, and in the lower position, the maintaining of the blocking element in the withdrawal position.

The triggering device of the gas generator can comprise a cover ensuring several functions including the fixing of the high pressure flexible tube and the closure of the metallic body which ensures the compression of the spring of the triggering arrangement. This advantageously permits the limiting of the weight, the cost and the overall dimensions of the triggering device.

In an aspect of the invention, an airbag device is described comprising a venturi system comprising an aspiration part with openings for the passage of exterior air drawn by the venturi system during its deployment. The outlet is in the form of a tube and the opening of the inflatable bag has fabric fixed by a clamping ring around the exterior of the tube, the body of the venturi system being disposed in a manner lying against the surface of the inflatable bag. The venturi system has a longitudinal shape, the longitudinal axis being disposed essentially parallel to the surface of the part of the bag on which the venturi system is mounted. The venturi system is mounted in a type of pocket created by the airbag such that the venturi system is protected from shocks by the airbag once this is inflated.

The venturi system can advantageously be covered by a net fixed to the inflatable bag permitting the exterior air to supply the venturi system. The net comprises opening and closing means, such as a zip fastener or Velcro, permitting access to the venturi system. The venturi system can advantageously be disposed on a central part of the inflatable bag configured to be disposed behind the head of the user during deployment and on a lower part of the central part such that the venturi system is turned towards the feet of the user.

In an aspect of the invention, a support is described which is intended to be worn by a user for a portable airbag system for people, in the form of a backpack. The backpack comprises a reinforced area, fixed on an edging of a part of the backpack so as to use the naturally reinforced areas of a backpack. The reinforced area comprises fasteners configured to be attached in a removable manner to fixing elements integral with the inflatable balloon, permitting the use of the backpack with or without the airbag system by the end user. The fixing elements can advantageously be in a T-shape and the fasteners in the form of slots. The backpack comprises a slot configured to permit the deployment of the inflatable balloon, this slot being closed by a closure openable under tension of the “Velcro” type or a zip fastener having a breaking area defined and calibrated to open in the case of inflation of the balloon.

According to an aspect of the invention, the airbag device is intended to be used with a plurality of portable systems for people, e.g. with different backpacks. In this case, it comprises an inflatable balloon, a gas generator and a venturi system connectable on the one hand to the gas generator, and on the other hand having an outlet inserted in an opening of the inflatable balloon, where the venturi system comprises an aspiration part with openings for the passage of exterior air drawn by the venturi system during its deployment. Such a device has the inflatable balloon arranged in a cover comprising fixing elements provided to be connected in a removable manner with complementary elements of the portable system for people. The cover is therefore a block which can be easily manipulated by a user. In this case, the venturi system is either connected through the cover or disposed in the cover with the inflatable balloon. The user therefore has only one “unit” in hand, the device according to FIG. 1*e*. The cover therefore comprises a closure of the Velcro type or of the zip type or a closure comprising a row of press-studs which is intended to allow the cover to be fixed on the support of the portable system for people by means of a closure of the Velcro type or of the zip type provided thereon, such that once it is fixed, the closure of the cover is open. Therefore, taking a device according to FIG. 1*e* with a suitable backpack, the cover is fixed in the bag and the opening of the cover allows it to be fixed in the backpack. It is preferable that a supplementary fastener of the support, e.g. provided beneath the site of the cover, forms the starting point for an additional strap which is to be drawn around the cover and to be fixed above the cover to further ensure that the opening of the balloon does not occur in the volume of the backpack but towards the support, therefore towards the back of the user.

The support is preferably a backpack or a jacket comprising the said reinforcements.

BRIEF DESCRIPTIONS OF THE DRAWINGS

Figure 1B:
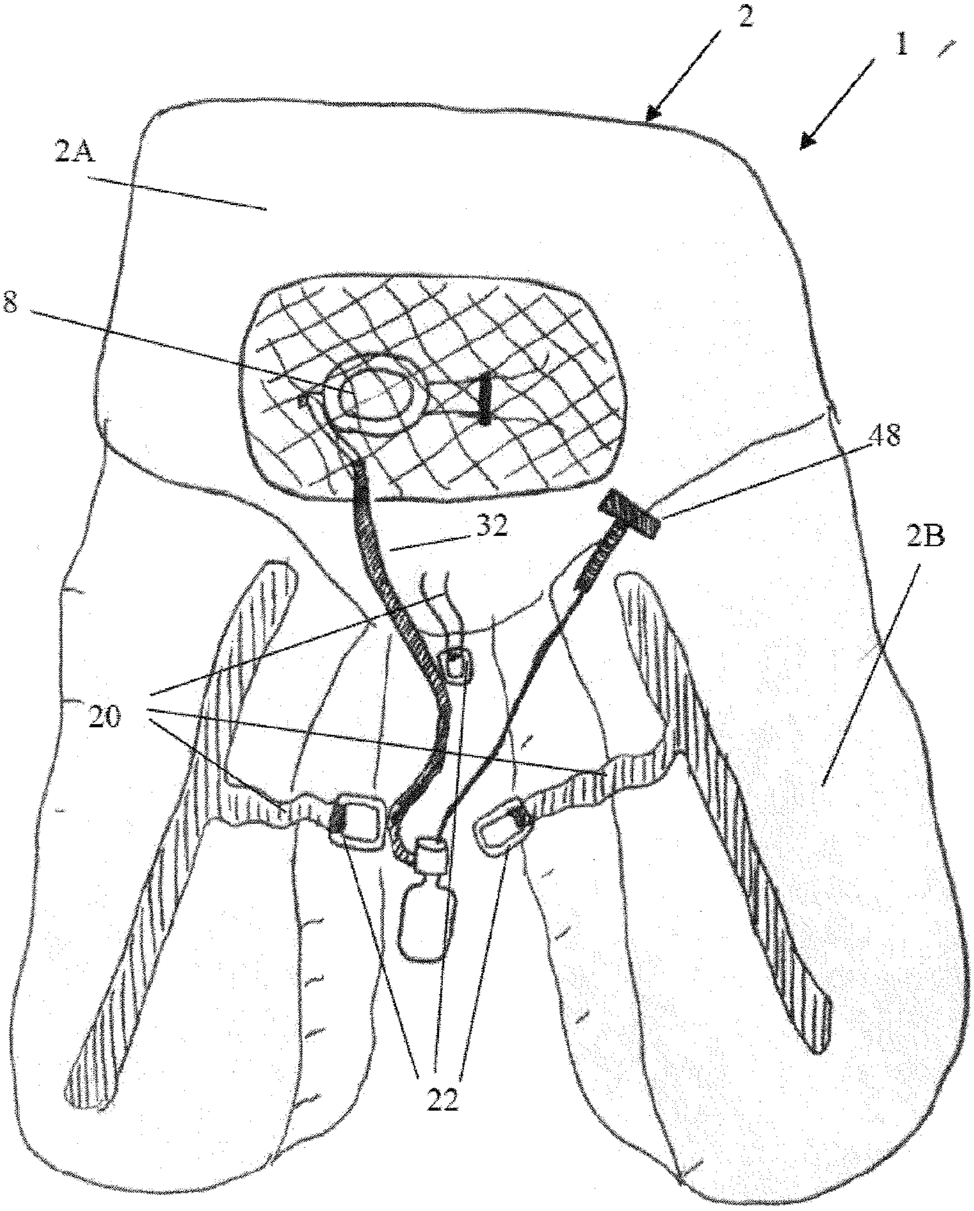
Figure 1C:
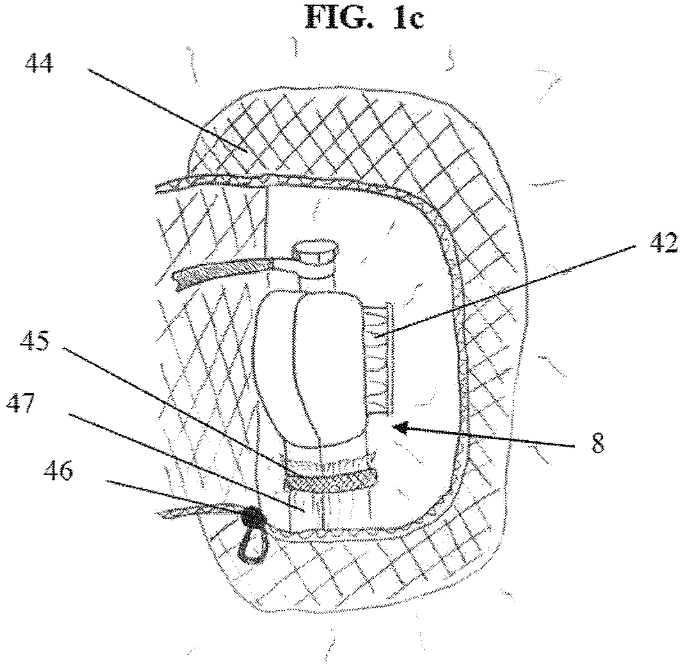
Figure 1D:
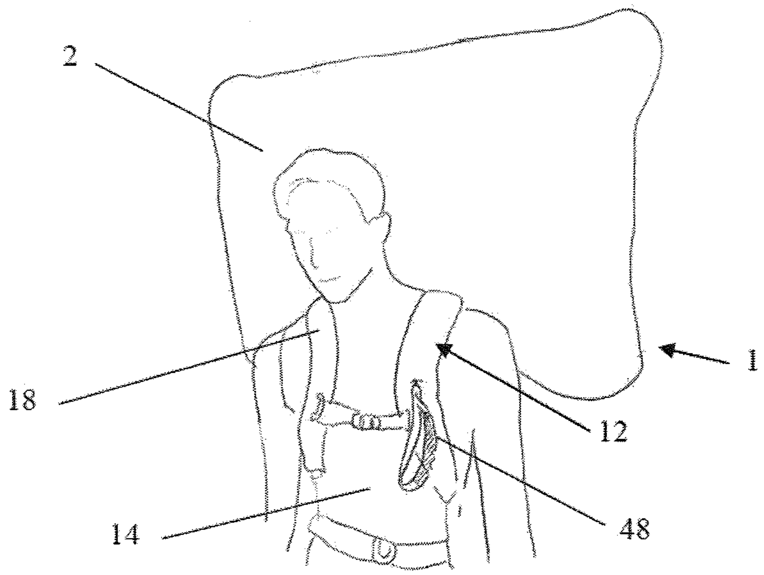
Figure 1E:
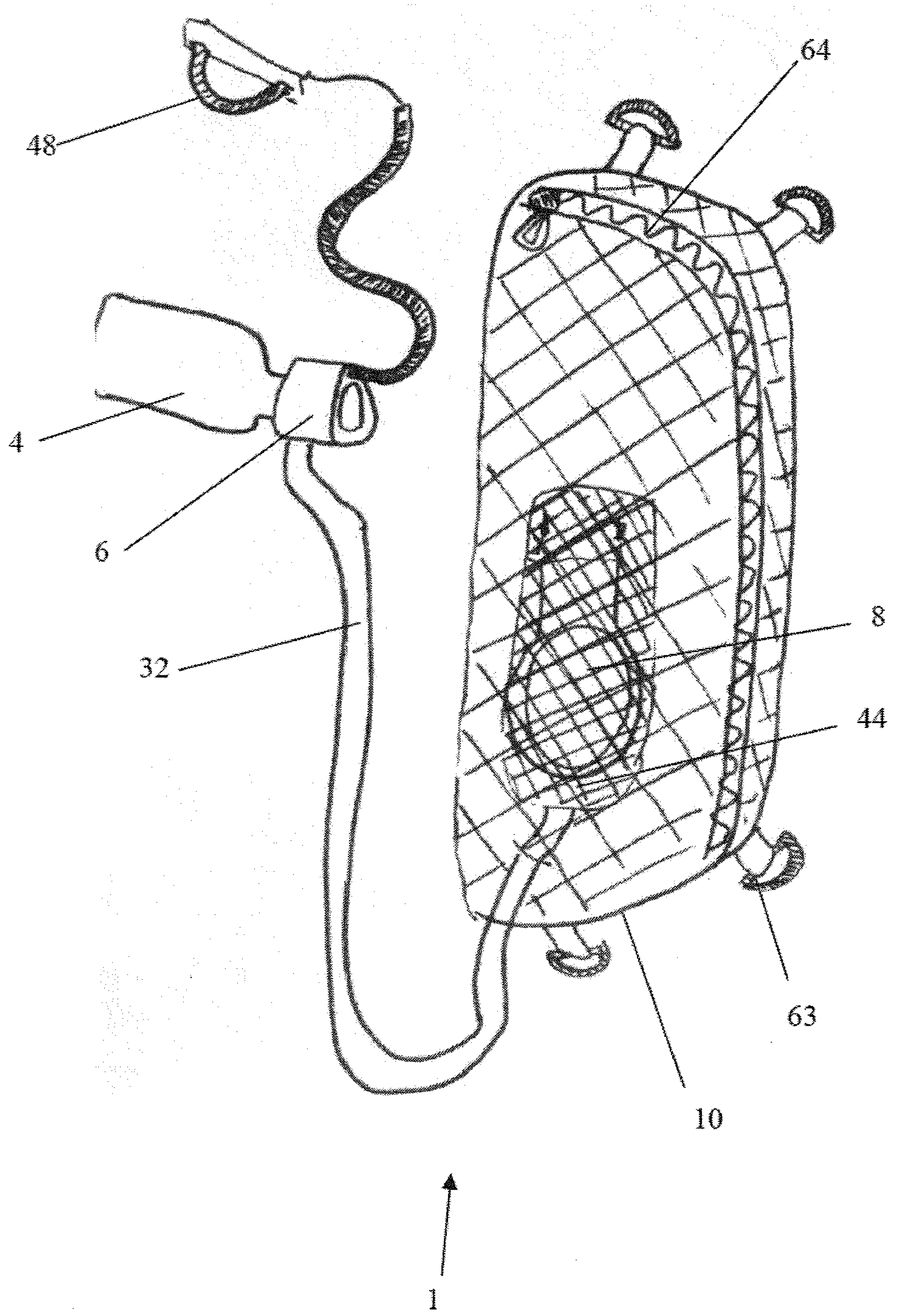
Figure 2A:
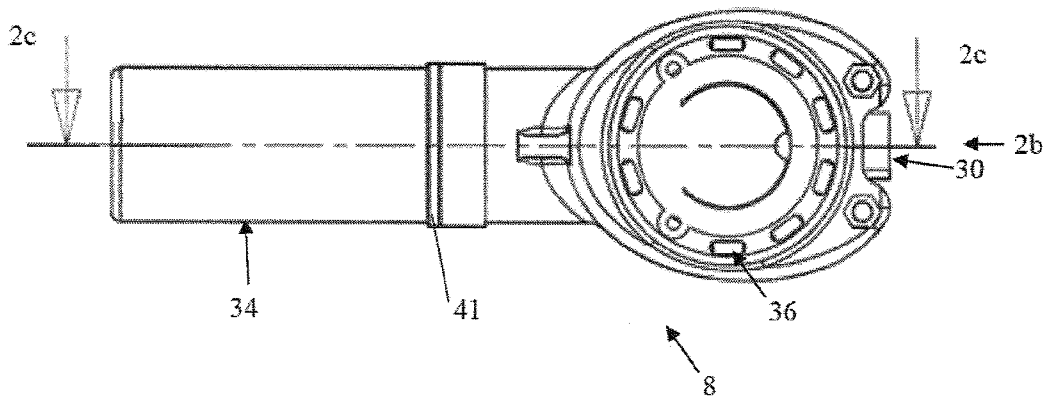
Figure 2B:
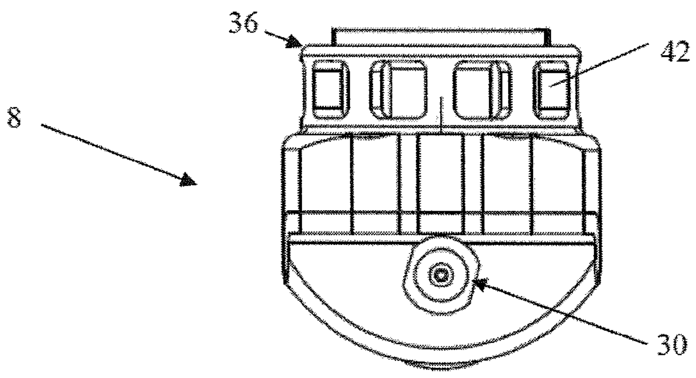

Other aims and advantageous aspects of the invention will emerge from the claims and from the description of embodiments of the invention below, with reference to the attached figures, in which:

FIG. 1*a* is an illustration in perspective of a portable airbag system for people, in deployed position, according to an embodiment of the invention;

FIG. 1*b* is a rear view of the deployed airbag system of FIG. 1*a* without its support (without backpack);

FIG. 1*c* is a partial detailed view of a part of the airbag system of FIGS. 1*a* and 1*b*, showing a venturi system of the airbag;

FIG. 1*d* is a front side view of the airbag in deployed position in the case of an essentially rectangular airbag;

FIG. 1*e* is a view of an airbag device according to an embodiment of the invention not mounted on a support of the system according to an embodiment of the invention;

FIG. 2*a* is a plan view of a venturi system according to an embodiment of the invention;

FIG. 2*b* is a view in the direction of the arrow 2*b* of FIG. 2*a;*

Figure 2C:
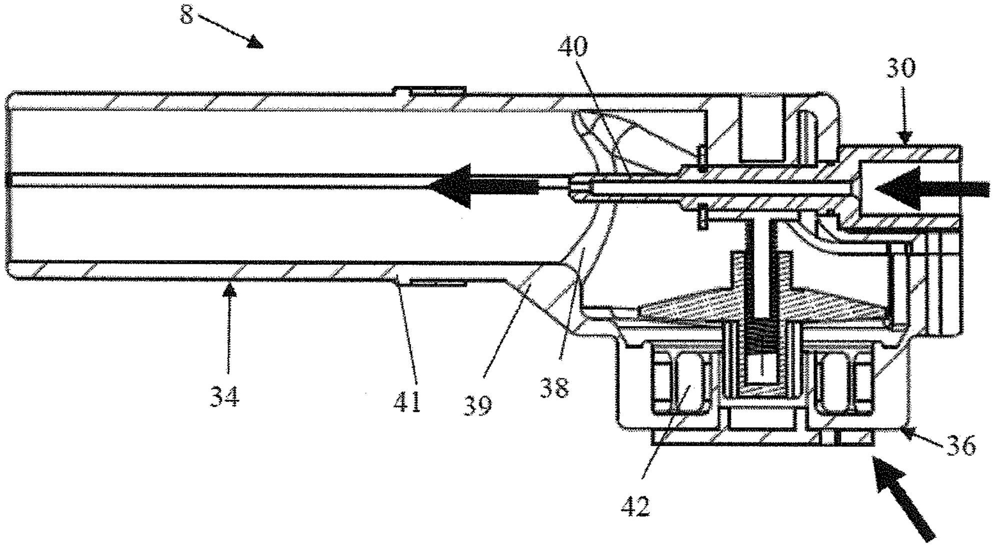

FIG. 2*c* is view in section through the lines 2*c*-2*c* of FIG. 2*a;*

Figure 3A:
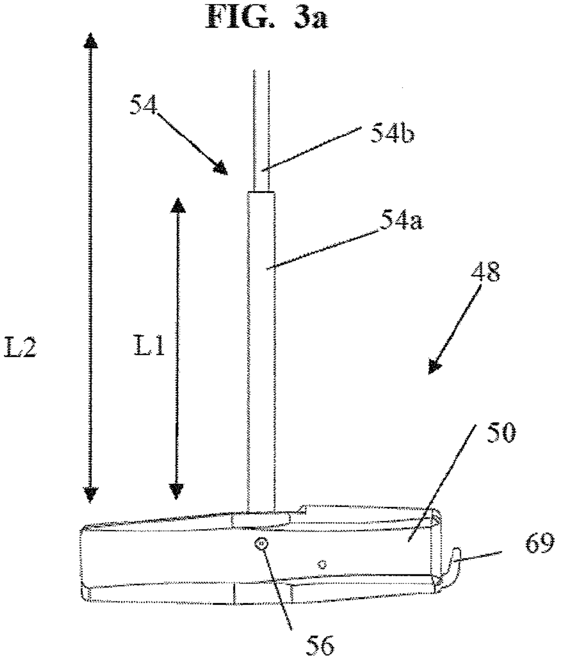
Figure 3B:
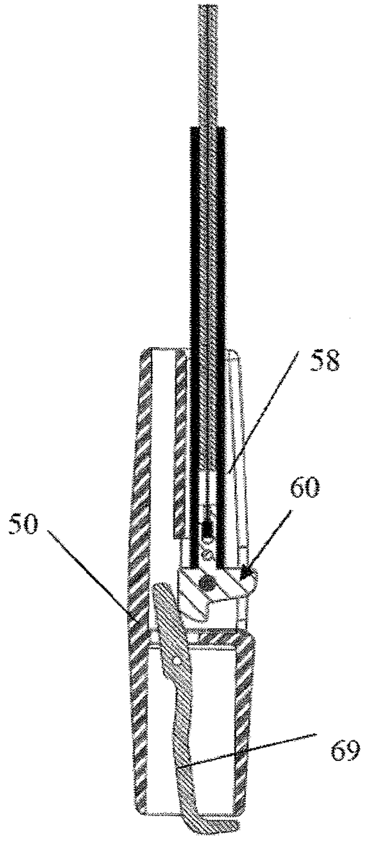
Figure 3C:
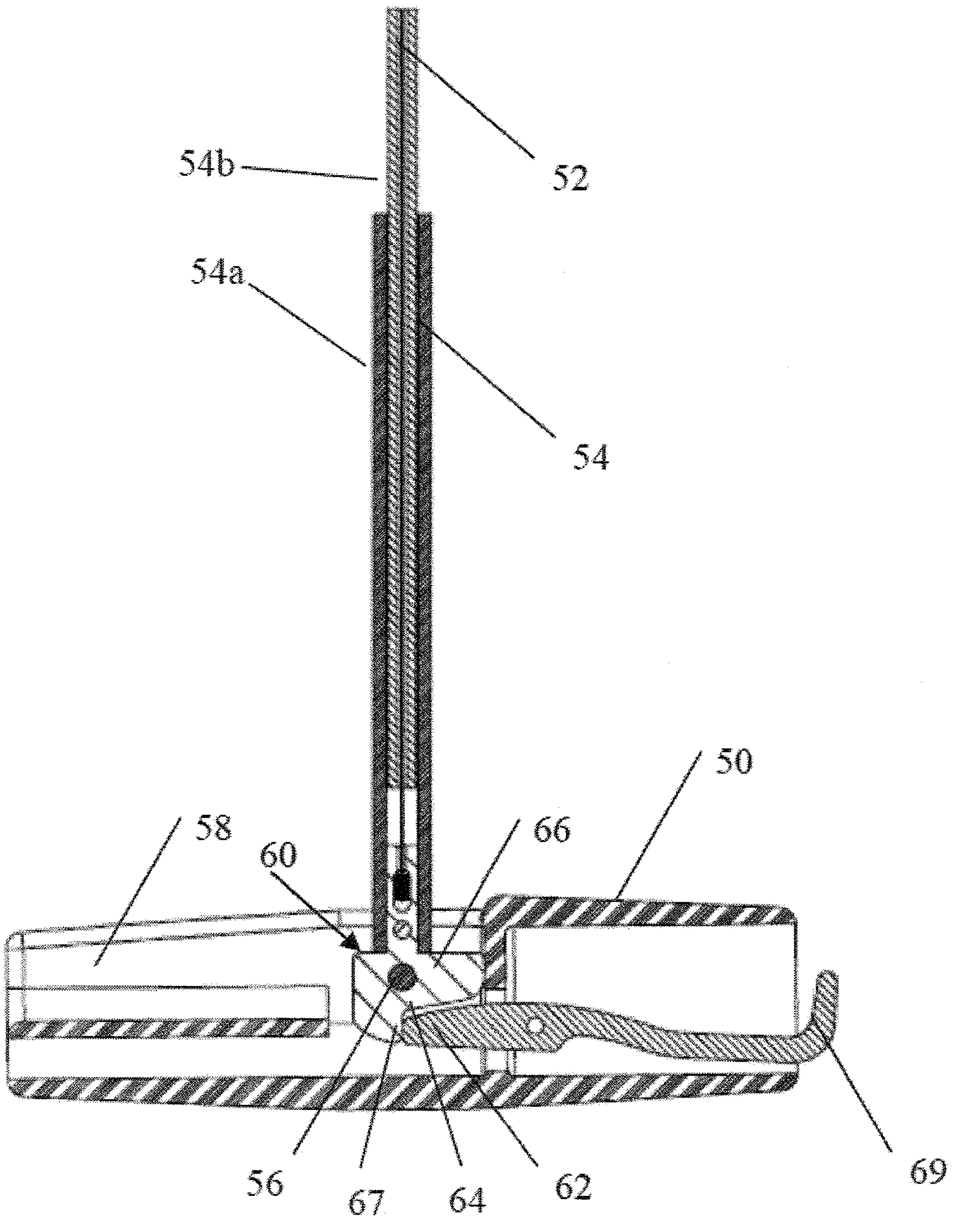
Figure 4A:
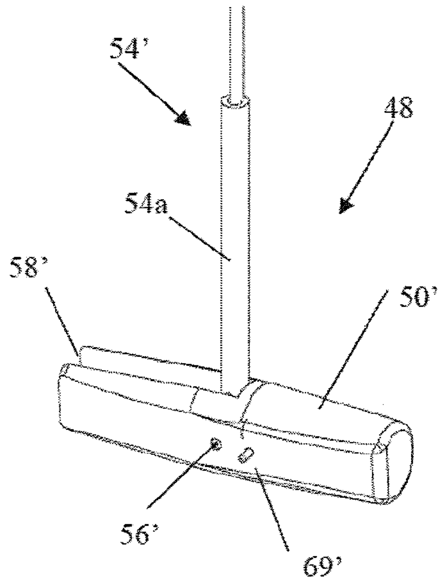
Figure 4A:
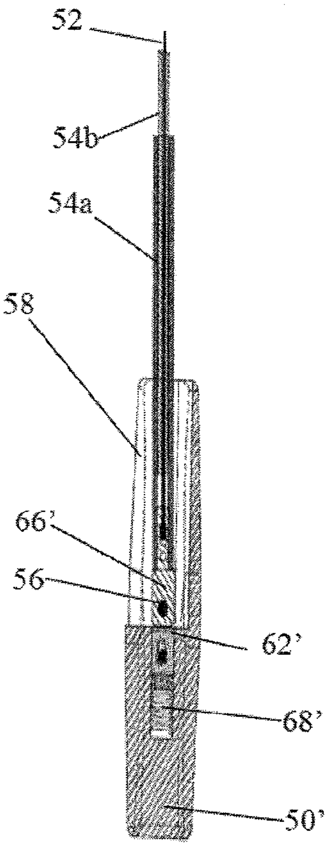
Figure 4C:
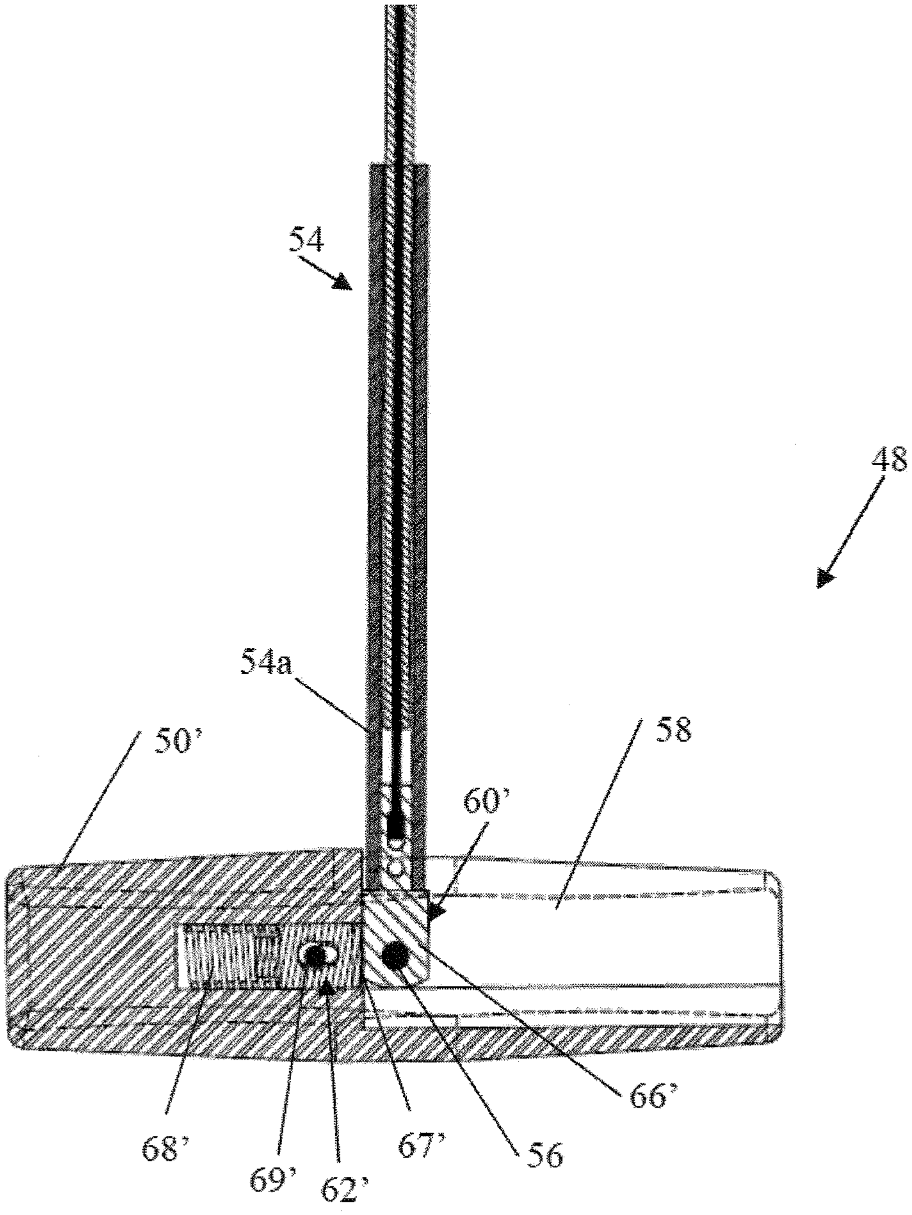

FIG. 3*a* is a view of a triggering handle device of an airbag system according to an embodiment of the invention;

FIG. 3*b* is a view in section of the handle device according to FIG. 3*a*, but in folded position for storage;

FIG. 3*c* is a view in section of the handle device according to FIG. 3*b*, in position ready for use;

FIG. 4*a* is a view in perspective of a triggering handle device according to a variant of the invention;

FIG. 4*b* is a view in section of the handle device according to the variant of FIG. 4*a* in folded position for storage;

FIG. 4*c* is a view in section of the handle device according to the variant of FIG. 4*b;*

Figure 5A:
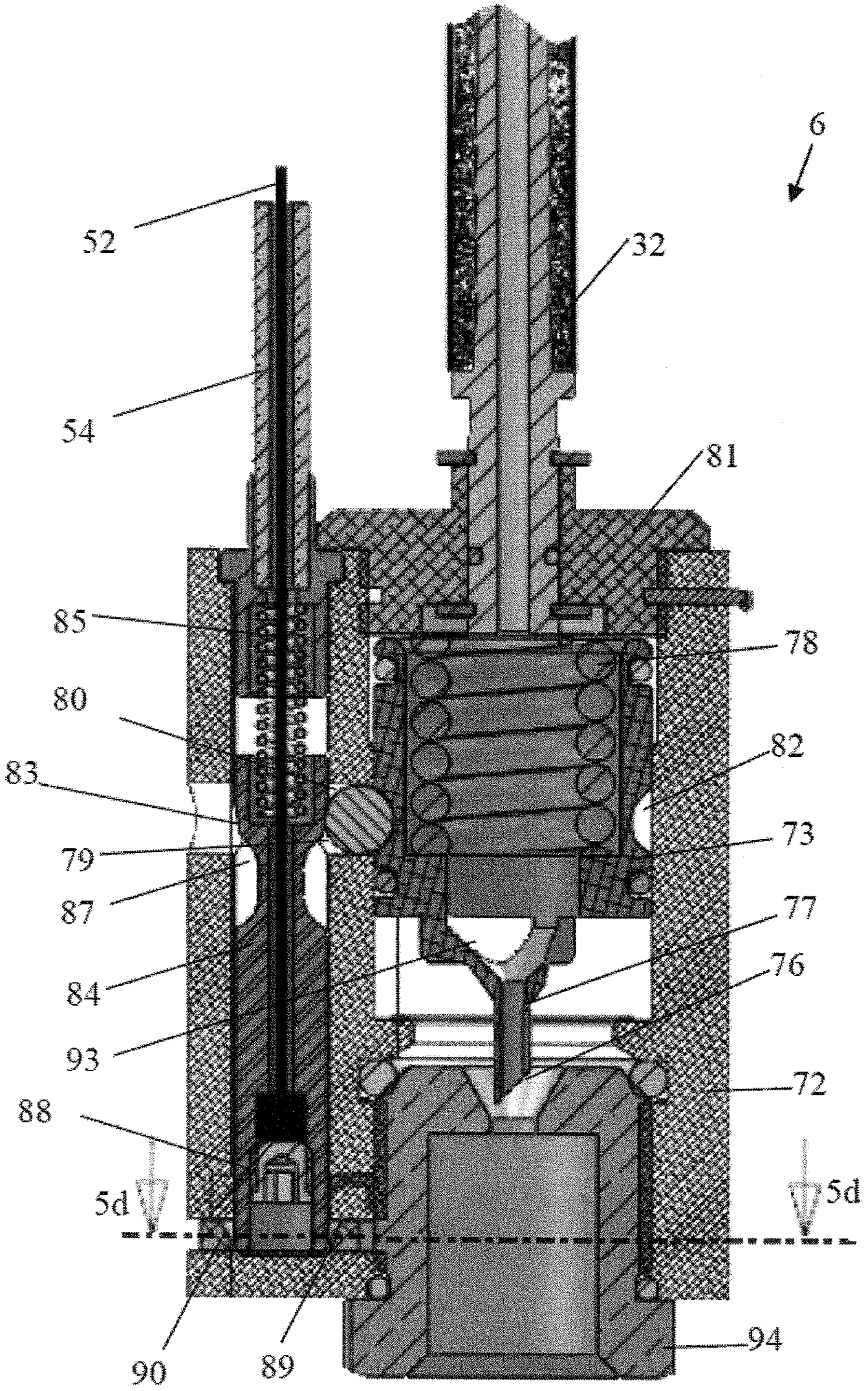
Figure 5B:
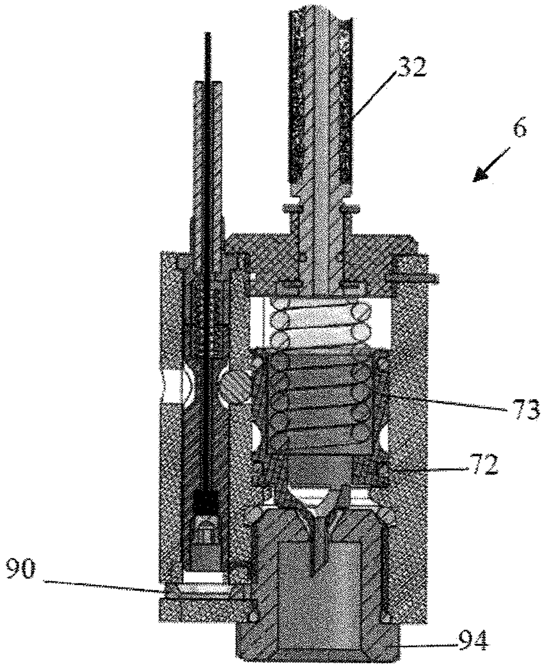
Figure 5C:
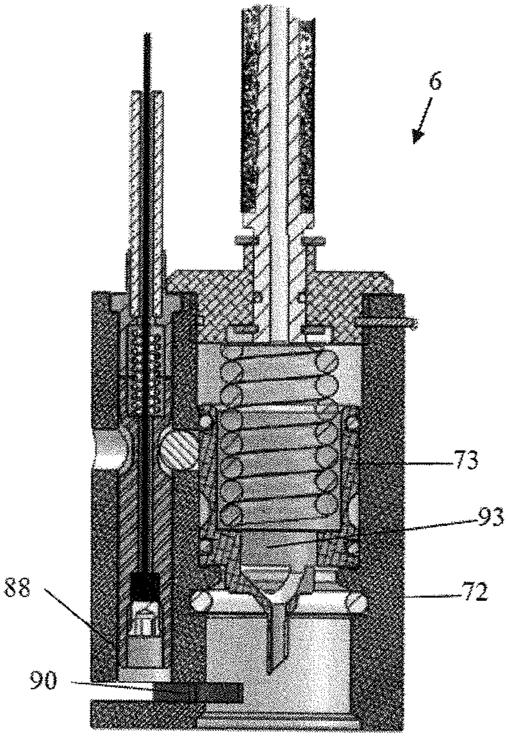
Figure 5D:
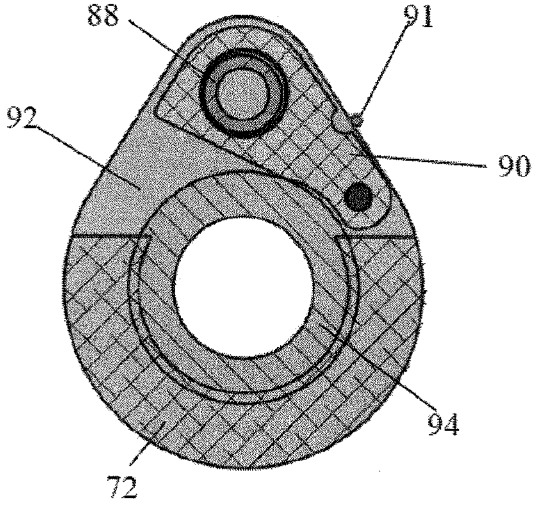
Figure 5E:
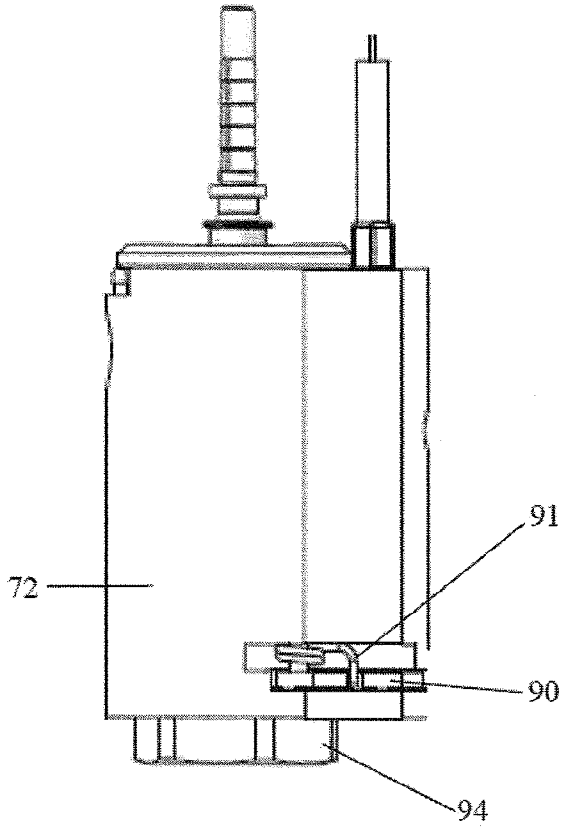
Figure 6A:
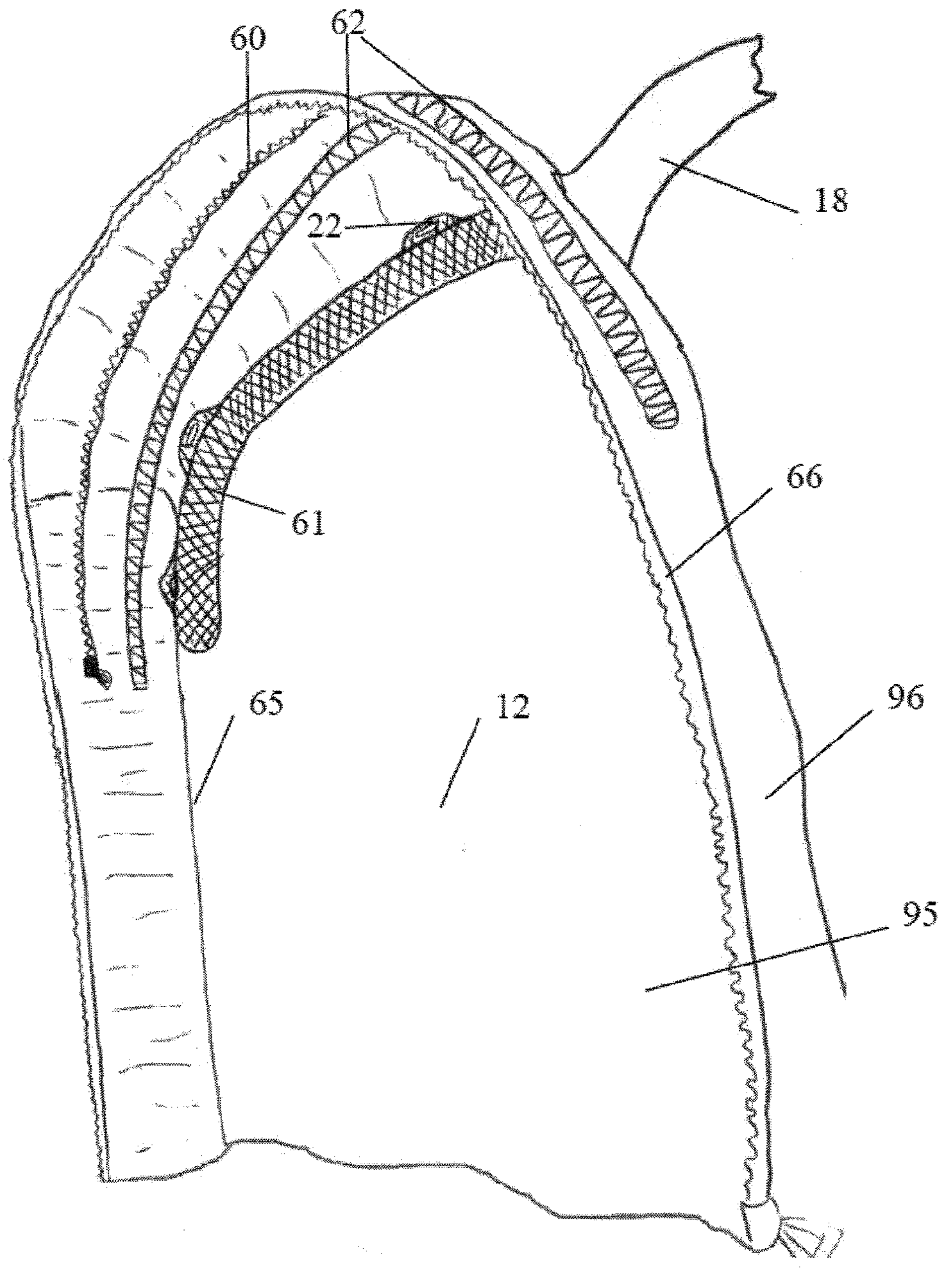
Figure 6B:
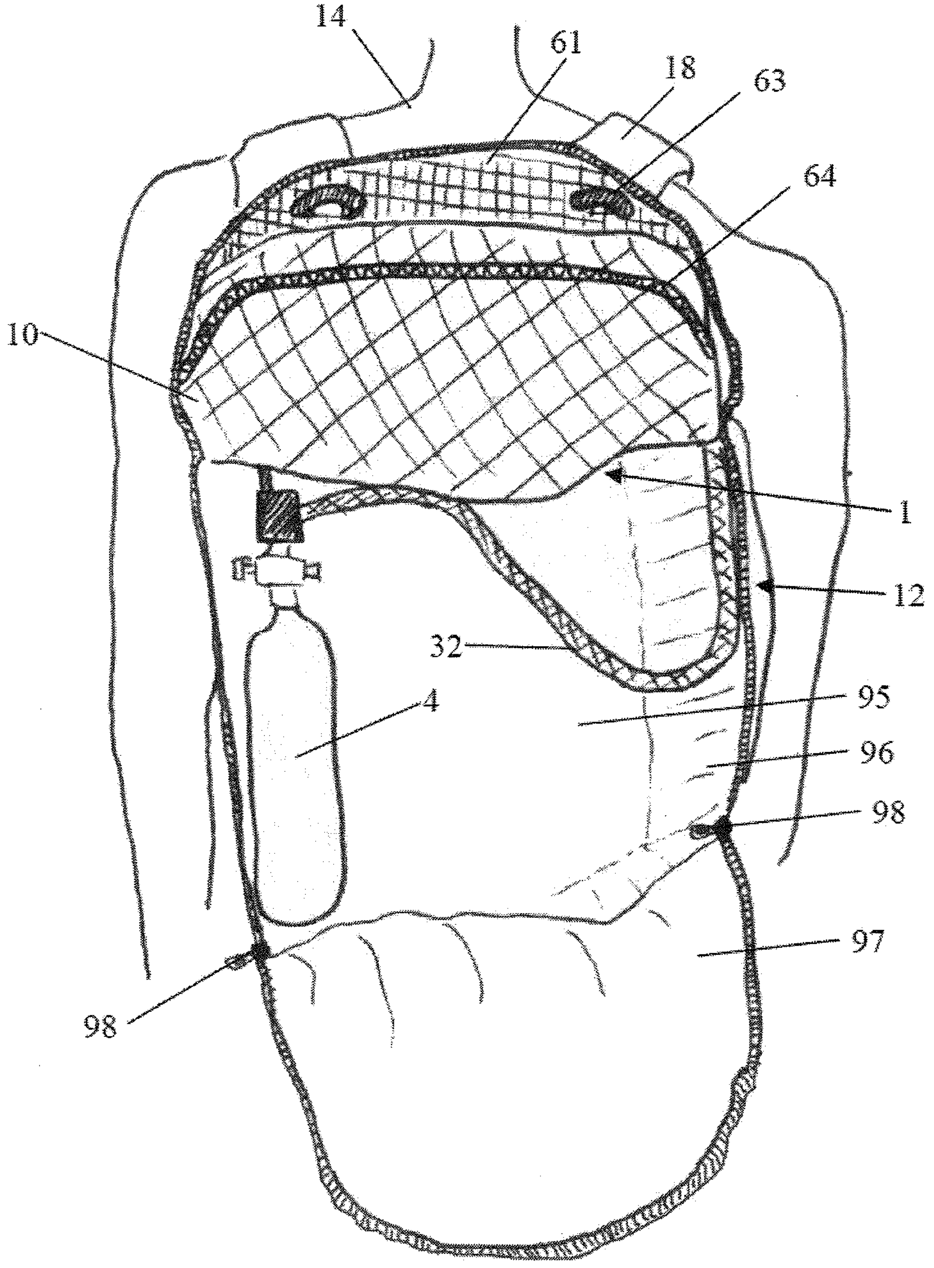
Figure 6C:
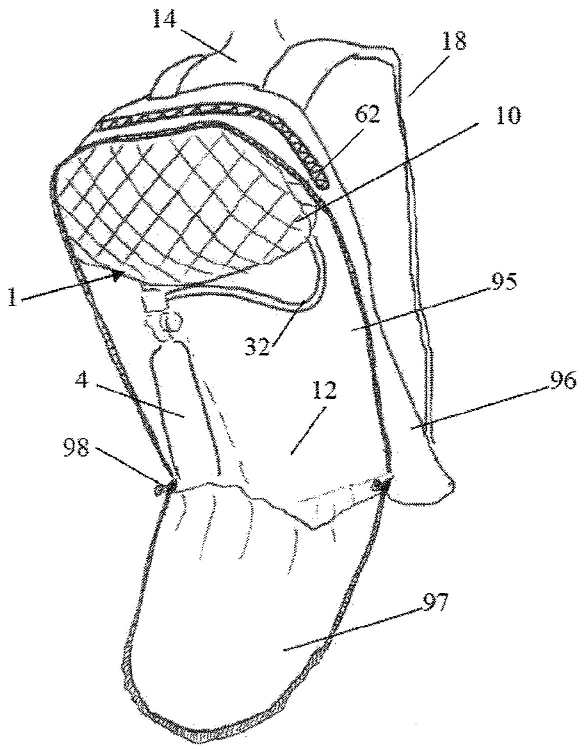
Figure 6D:
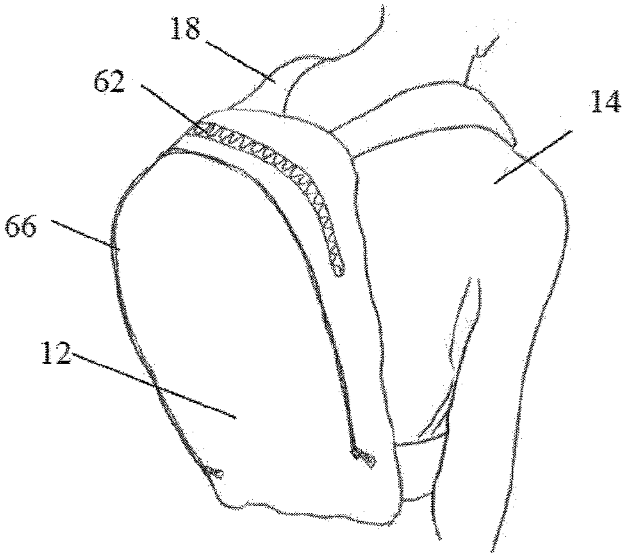
Figure 6E:
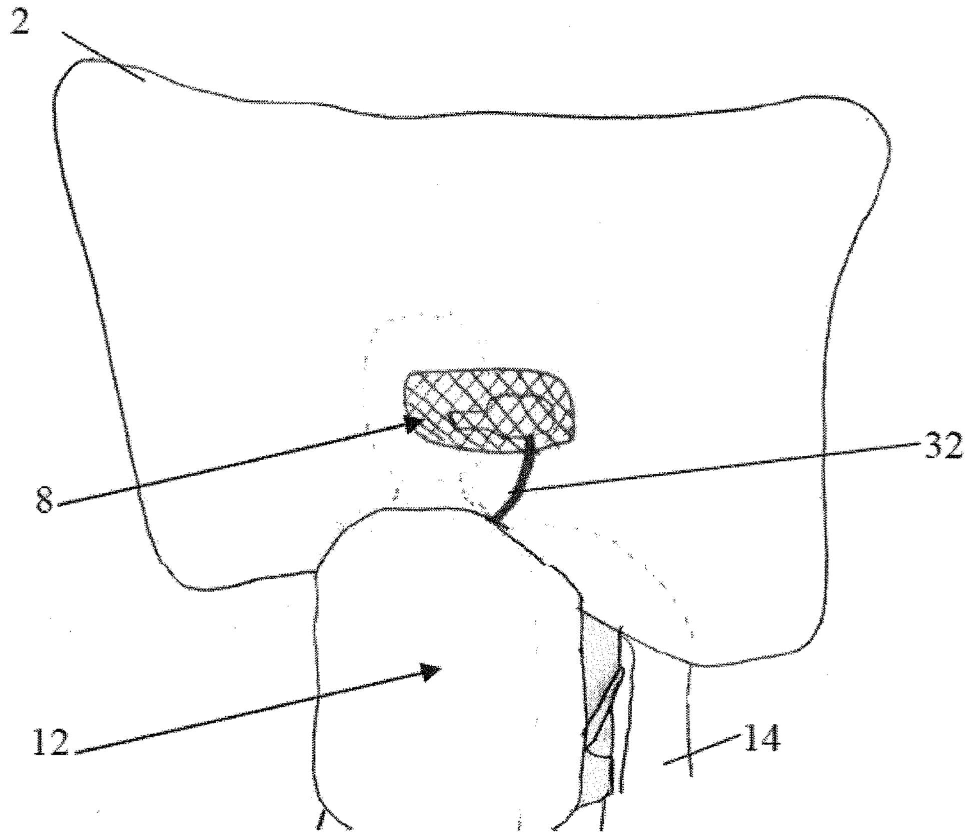
Figure 7:
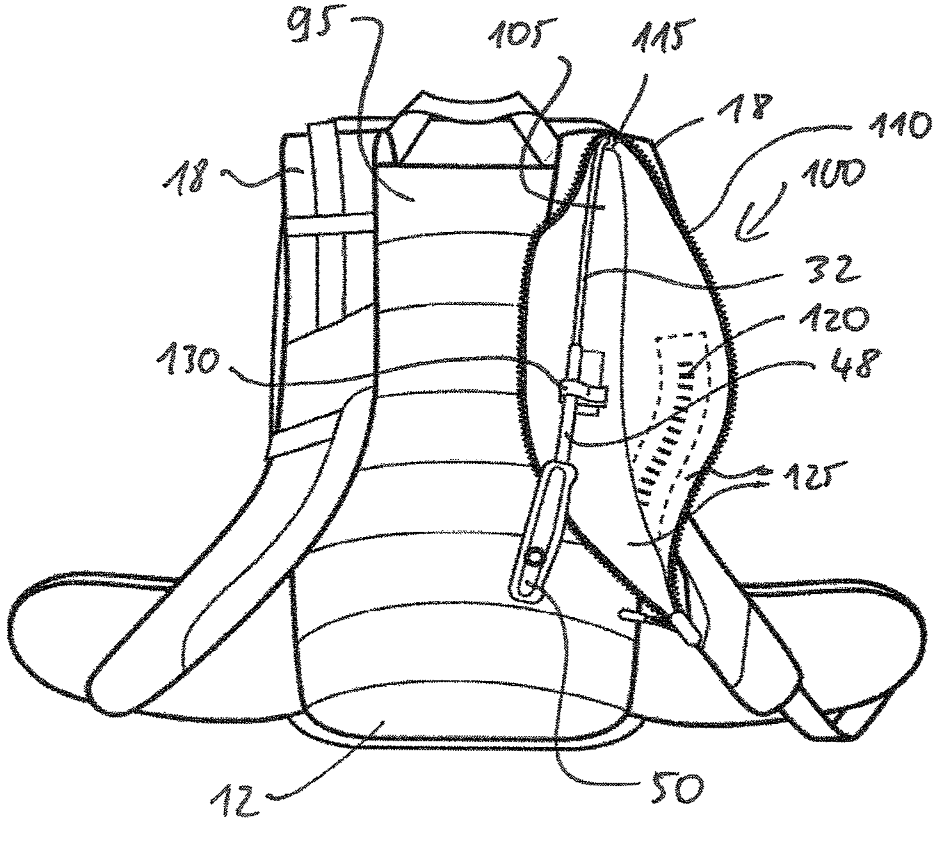

FIG. 5*a* is a view in section of a triggering device for a gas generator according to an embodiment of the invention, in position before triggering, ready for assembly of a gas generator;

FIG. 5*b* is a view similar to FIG. 5*a* showing the triggering device in triggered position;

FIG. 5*c* is a view of the triggering device according to FIGS. 5*a*, 5*b* once the gas generator is removed and with a latch preventing the fixing of a gas generator;

FIG. 5*d* is a view in section of the triggering device according to the variant of FIG. 5*a* in position before triggering, ready for assembly of a gas generator;

FIG. 5*e* is a view of the triggering device before triggering, ready for assembly of a gas generator;

FIG. 6*a* is a view of a support of the portable airbag system before assembly of an airbag device, according to an embodiment of the invention, in which the support is a backpack;

FIG. 6*b* is a view of the portable airbag system according to the embodiment of FIG. 6*a* after the fixing of the airbag device on the support;

FIG. 6*c* is a view of the portable airbag system once the fixing of the system is completed and with a cover giving access to the fixing area in open position;

FIG. 6*d* is a view of the airbag system once the fixing of the support and airbag device is completed and with the opening giving access to the fixing area in closed position; and FIG. 6*e* is a rear view of the airbag system in the case of a rectangular inflatable balloon once the latter is triggered;

FIG. 7 is an illustration in perspective of a backpack according to an advantageous aspect of the invention comprising a portable airbag system for people according to an embodiment of the invention.

DETAILED DESCRIPTION OF THE INVENTION

With reference to the figures, firstly to FIGS. 1*a* to 1*e* and 6*a* to 6*e*, a portable airbag system for people according to the invention comprises a support 12 and an airbag device 1. The airbag device comprises an inflatable bag or balloon 2, a gas generator 4, a triggering system of the gas generator (for example a cartridge) 6, a venturi system 8 interconnected fluidically to the gas generator 4, and a cover, bag or other storage means 10 in which the balloon is stored before deployment. According to an advantageous aspect of the invention, the airbag system 1 is fixed in a removable and separable manner to the support intended to be worn by a user, the support being able to be a backpack 12 or a jacket (not illustrated) or a simple harness (not illustrated) acting as a support for the airbag system. The support is worn by a user 14 at least partly on his back 16*a* and, according to the variant, partly on his thorax 16*b*, for example by means of shoulder straps 18 of a backpack 12 or of another support worn by the user.

According to a variant of the invention, the airbag device according to the invention can also be integral or fixed permanently (i.e. non-separably) to a harness, jacket, backpack or other equipment worn by the user.

According to an aspect of the invention, the airbag device according to the invention is configured to be worn and to be disposed on the back of the user, in particular the upper part of the back of the user, for example at the level approximately of the shoulders of the user.

According to an advantageous aspect of the invention, the main part of the airbag device comprising the inflatable balloon 2, the venturi system 8 and the gas generator 4, is mounted together forming a compact, separable and removable unit stored in a cover 10 or bag part. This main part of the airbag device is configured to be disposed entirely on the back of the user, whilst being configured to be deployed for example around the rear part of the head and the sides of the head of the user and, according to the variant, descending on the front side of the thorax. Such a configuration allows there to be an airbag device forming a compact unit separable from the support worn by the user, but which can protect the head and the thorax of the user. This aspect of the invention also permits a complex configuration of the airbag system to be avoided in each shoulder strap, which increases the costs of manufacture and assembly and makes the airbag very specific and adaptable with difficulty to different pieces of equipment of users. An assembly with the elements mentioned according to an embodiment of the invention is represented in FIG. 1*e*.

In other words, the assembly of the protective cover 10 comprising the inflatable balloon 2 and including the venturi system 8 and fasteners 63 with the gas generator 4 linked by the tube 32 and connected with the triggering arrangement 48 is intended to be used with any backpack comprising complementary fastener elements 22 and preferably a storage means 100 in the shoulder strap as represented in FIG. 7.

An airbag bag intended to protect traumas comprises a central part 2*a* configured to be disposed behind the head of the user and, if applicable, lateral parts 2*b* configured to be disposed on either side of the head of the user, descending on the front part of his thorax. The lateral parts 2*b* each comprise a positioning strap 20, the strap being fixed at one end to an intermediate area of the lateral part, the other end being attached to the user's equipment, in particular the support device worn by the user. One of the ends of the strap can be provided with a loop, clip or other separable fixing means configured to be coupled to a complementary fixing means connected to the user's equipment, in particular in an advantageous embodiment, to the shoulder straps 18. The positioning straps 20 have a length configured to permit the lateral parts 2*b* of the bag to be stored in their cover on the back of the user, but during the inflation of the bag they form attachment points which cause the lateral parts 2*b* to inflate towards the front of the user, with the straps pivoting from a position folded towards the user's shoulder to a lower position towards the user's abdomen. These positioning straps thus advantageously permit the airbag to be mounted on the back in a compact unit, whilst ensuring the deployment of the lateral parts towards the front. The airbag device can be removed by clipping means from the support worn by the user. The support system intended to be worn by the user only necessitates fixing means such as slide loops for loops 22, and also a zip fastener 60 (see FIG. 6*a*) or other simple fixing means for positioning the airbag device on a backpack, jacket or harness of a user. The adaptation of an item of the user's equipment is therefore economical and permits a great flexibility of use of the airbag device without modification of the airbag system on all kinds of supports or bases worn by the user. One of the important advantages is that the user can have only one single airbag system, but different supports, such as backpacks of different volumes, a jacket, a harness or other items of equipment without having to have several airbag systems, which are relatively costly, but whilst having a very compact, safe, reliable and economical system. Another important advantage of the system is that the user can easily lighten the support of the airbag system to use it under conditions where there are no avalanches or not necessitating the wearing of an avalanche airbag.

The positioning straps 20 can have an adjustment means having a length which permits the length of the straps to be adjusted for an adjustment as a function of the equipment and the position of the fastening point on the equipment. Preferably, however, the straps have a length which is already fixed, the position of the fastening point on the jacket, the shoulder strap 18 or the harness being positioned on the optimum position on manufacture of the equipment.

Referring now to FIGS. 1*a* to 1*c* and FIGS. 2*a* to 2*c*, the venturi system 8 comprises an inlet 30 coupled fluidically to the gas generator 4 by a tube, for example a high pressure flexible tube 32, an outlet 34 intended to be connected to the inflatable balloon for blowing air and gas into the balloon, an aspiration part 36 for drawing air in the venturi system, and a venturi effect channel 38 inside the case 39 of the venturi system 8. Gas (G) of the gas generator injected in the inlet 30 flows at high speed and is projected by a nozzle 40 in the direction of the outlet 34. The flow of gas at high speed in the venturi effect channel 38 formed by the case 39 creates an area of negative pressure in the area surrounding the nozzle 40 and upstream of this area so as to draw the air from the exterior through the openings 42 of the aspiration part 36 and to project it towards the outlet 34. The venturi effect is well known per se, and also the hydrodynamic effect, and will not be described in further detail.

According to an advantageous aspect of the invention, the nozzle 40 of the venturi system also plays the role of a link between the venturi system 8 and the high pressure flexible tube 32, whilst permitting a rotation around its longitudinal axis. This nozzle permitting a rotation around its axis offers the advantage of giving an additional degree of freedom to the high pressure tube and hence of limiting the forces transmitted on the venturi system 8 by the high pressure tube 32.

This venturi effect permits the bag to be inflated with a limited volume of compressed or pyrotechnic gas, for example only providing ⅓ of the gas filling the bag, the remainder being air drawn from the exterior. According to an advantageous aspect of the invention, the outlet 34 is in the form of a tube extending integrally from the case 39 of the venturi part, the tube being configured to be inserted in an opening of the bag forming a tube part which is clamped on the exterior of the outlet tube 34 by a clamping means in the form of clamping bands or by a crimp band, or by any other clamping ring. A radial shoulder 41 on the outlet tube allows the retaining and the locking of the clamping ring to the venturi system, the clamping ring being disposed between the shoulder and the part of the case surrounding the venturi device. An advantage of this configuration according to the invention is that the venturi system can be manufactured and finished entirely before being assembled to the inflation bag by a simple clamping ring 45, this fixing means being very reliable, simple and robust, thus simplifying the manufacture of the inflation bag compared with the currently known airbag systems.

According to an advantageous aspect of the invention, the venturi system, fixed by a clamping ring 45 to a tube of fabric 47 or of the flexible material of the bag (see FIG. 1*c*) is disposed lying on the bag and held in this position covered by a protective net 44. The protective net has meshes which allow the air to pass freely for the inflation of the bag, but which form a protection against snow, leaves, or other external objects from entering into the venturi system and limiting or blocking the aspiration of air during deployment.

According to a variant, the protective net (see FIG. 1*c*) is provided with a zip fastener 46 or other closure, for example of the Velcro type, permitting the net to be opened or closed above the venturi system such that one may have access to the venturi system, for example for matters of maintenance or replacement. It can also be envisaged to leave passages of one or of two sides of the net large so as to have access beneath the net to the venturi system. The arrangement of the venturi system lying against the surface of the inflation bag, i.e. where the axis of the long part of the case is essentially parallel to the surface of the fabric of the bag (also corresponding to the entry direction of the gas of the generator) permits a very compact configuration and offers a good protection to the venturi system during its deployment.

On the other hand, according to an advantageous variant, the venturi system 8 is disposed on the central part 2*a* of the bag (see FIG. 1*a*), in particular on a lower part of the central part turned towards the ground when it is worn by the user, such that the venturi system is well protected from external objects when it is deployed. Once the airbag is inflated, the venturi system does not create any bulge or increased thickness exceeding the majority of the surface of the airbag on which the venturi system is mounted, this being so as to have an optimum protection from shocks. This position also protects the venturi system from blocking by snow or other external elements, in any case better than if it were on the top or the front of the bag, whilst giving it good access to the external air which is to be aspirated. The invention therefore permits there to be a venturi system mounted on the exterior of the inflatable balloon but protected from shocks by the latter.

According to a variant, it is possible to have an outlet tube 34 which is curved or which comprises a bent part so as to penetrate in the opening of the bag at an oblique or perpendicular angle to the general surface of the bag surrounding the venturi system.

With reference to FIGS. 1*d* and 3*a* to 4*c*, a triggering handle device 48, 48' is illustrated.

The triggering handle device 48 comprises a handle part 50, 50' connected to a cable 52 linked to the triggering device 6 for the deployment of the airbag. Arranged around the flexible cable 52 is a rigid or semi-rigid tube 54*a*, 54*b*, for example a tube of polyethylene or other plastic or elastic material which gives a certain rigidity at a certain length L1, L2 of the cable extending from the handle part 50. The length L2 of the tube 54*b* can be in the order of 10 to 25 cm and advantageously permits the position of the handle to be better defined, disposed for example in the vicinity of the centre of the thorax, so that the user can access it quickly even in a situation of stress or panic. In fact, the rigid or semi-rigid tube allows an excessive swinging of the part of the handle to be prevented and allows it to be presented at a well determined angle and able to be taken hold of in a crossed manner. For a right-handed person, the cable extends from the triggering device 6 disposed on the user's back above his left shoulder and going in a direction towards the ground and optionally obliquely towards the centre of the thorax, the person crossing his right forearm in front of his thorax at an angle approximately aligned with the tube 54. Means such as a band of fabric, or rings on the support such as a jacket or shoulder straps, can be used to guide and support the tube 54*a*, 54*b*. In a variant, there can be two coaxial stiffening tubes, a first tube 54*a* extending from the part of the handle 50 of length L1 and a second tube 54*b* of length L2 of smaller diameter, this being so as to have a greater flexibility at a position further away from the part of the handle.

The tube 54*a* is fixed in a pivoting manner to the handle part 50, 50', with a pivot 56 permitting the tube 54*a* to be pivoted from a position essentially perpendicular to the axis P of the handle part 50 to a position essentially parallel to the handle part in a housing 58 formed in the handle part 50, 50'. Thus, when the airbag system according to the invention is not used, the handle part can be folded and can be aligned in the axis of the cable and stored in a cover, for example the cover in which the balloon is disposed, or along the cover on the exterior in a compact manner and reducing the danger of unintentional hooking of the handle onto external objects. In this ready-to-use position, the handle part 50, 50' is therefore disposed transversely to the tube section 54*a* and held in this position by a locking system 60.

In the variant according to FIGS. 3*a* to 3*c*, the locking system comprises a pivoting locking finger 62 pushed by a spring 68 towards a recess 64 of a pivoting body 66 fixed to the triggering cable 52 and to the tube 54. The recess forms a shoulder 67 which abuts against the end of the finger 62 so as to prevent the rotation of the body in the stored position. So as to store the handle, the finger is pivoted manually by the manual deflection of an arm 69 connected integrally to the locking finger 62.

According to the variant illustrated in FIGS. 4*a* to 4*c*, the locking system comprises a pivoting body 66' fixed to the triggering cable 52 and to the tube 54, 54*a* and held in the locked position by a stop 62' or linearly removable fork and pushed in a position resting against the body 66' by a spring 68'. The part 60 has a surface which prevents the rotation of the body 66' whilst the part 60 is locked. When one wishes to store the handle, i.e. to turn the tube 54 in the housing 58, the user pushes the button 69' allowing the part 60' to be freed, thus allowing the rotation of the part 66'.

Referring now to FIGS. 5*a* to 5*c*, the triggering device 6 according to an embodiment of the invention is illustrated. The triggering device comprises a body 72, in which a triggering arrangement 73 is mounted in a sliding manner, comprising a triggering point 76 provided with a passage 77 for the flow of the gas under pressure contained in a bottle of compressed gas 94 (illustrated only partially). The point 76 is a sharpened point intended to perforate a breakable part of the bottle of compressed gas. Within the scope of the invention, the point 76 can also be configured to strike a pyrotechnic element forming the gas generator.

The triggering arrangement 73 comprises a prestressed spring 78 compressed before use, as illustrated in FIG. 5*a*. The triggering arrangement 73 is held locked in its upper position, i.e. before triggering, by a removable locking protuberance 79 which, in this variant, is in the form of a ball guided in a passage 80 of the body 72 and engaged in a depression or cavity 82 of the triggering arrangement 73. The ball 79 is held in the locked position by a trigger element 84 of the actuator 86 connected to the triggering cable 52. A spring 85 pushes the trigger element 84 downwards in its locked position and, when one pulls on the cable 52, the spring is compressed and the trigger element resets until a depression 87 of the trigger element is at the height of the ball 79 which can thus move to release the depression 82 in the triggering arrangement 73.

The triggering device 6 comprises a metal body 72 with two parallel chambers. These two parallel chambers permit the interaction of the various elements, because the elements are parallel. The interaction of the trigger 84 between the cable 52, the triggering arrangement 73 by the ball 79 and the blocking element 90 is such that the trigger element 84 which is connected to the cable 52 permits in the upper position the triggering of the triggering arrangement 73 by the ball 90 and in the lower position the retaining of the blocking element 90. This advantageously allows the weight, the cost and the overall dimensions of the triggering device to be limited. Furthermore, this limits the number of parts coming into play in the good positioning of the ball, thus limiting the risks of malfunction.

The device comprises furthermore a cover 81 ensuring several functions, in particular the fixing of the tube 54, the fixing of the high pressure flexible tube 32 and the closure of the metallic body which ensures the compression of the spring 78. This advantageously permits the weight, the cost and the overall dimensions of the triggering device to be limited.

The trigger element 84 engages at its end 88 in a complementary cavity 89 of a blocking element 90. The blocking element 90 is mounted removably in a cavity of the body 72 and is pushed by a spring 91 towards an opening 92 in which the head of the gas generator is inserted and fixed. In its locked position before triggering, the blocking element 90 is released from the opening 92, permitting a gas generator to be screwed (or fixed by other means) to the body 72 of the triggering device. If the triggering arrangement 73 is in the lower position, which implies that the trigger element 84 is in reset position and the end 88 released from the blocking element, the latter is pushed by the spring 91 so as to engage at least partially the opening 92 and blocks the insertion of a gas generator. This allows it to be ensured that the locking blocking element is in its locked position and the triggering arrangement is in its upper position before assembling a gas generator to the triggering device. In the variant which is illustrated, the blocking element 90 is mounted pivotably to the body 72 of the device, but can also be mounted slidably without a pivot.

According to an advantageous aspect of the invention, the triggering point 76 is configured in the form of a perforation point and provided with an interior channel 77 for the passage of the gas contained in a bottle of compressed gas. A portion of the gas passes to exterior of the needle, and the wall of the triggering arrangement at the base of the point 76 is provided with one or more lateral openings 93 permitting the passage of the gas, this being to prevent a jack effect.

This advantageous solution allows the force to be limited which is necessary for the good perforation of the cartridge. The gas therefore passes through a central hollow part of the triggering arrangement 73 and through the lateral openings 93 of the triggering arrangement to then be injected in the high pressure tube 32 connected to the triggering device.

In an aspect of the invention, the airbag device comprising a triggering point 76 with a spring 78 for pushing the point is reset by means of a tool 87 permitting the blocking element 90 to be pushed then the triggering arrangement 73 to be reset. Once the triggering arrangement 73 is reset, the ball 79 retains it in the upper position and the tool 87 can be removed. This solution advantageously permits the triggering device 6 to be reset simply, without the risk of erroneous handling and with a compact tool.

Referring now to FIGS. 6*a* to 6*d* and also FIG. 1*e*, a fixing device permitting the fixing of the airbag device on a type of support according to an embodiment of the invention is illustrated. The fixing device comprises a support, being able to be a backpack 12 comprising a dorsal wall 95, a lateral wall 96, and an opening wall 97 housing a capacity volume of the bag. The support further comprises a fastening means 60, being able to be advantageously a zip fastener, a reinforced area 61, an openable slot 62 through which the inflatable bag is deployed, and an access opening 66 being able to be closed by the opening wall 97.

The reinforced area 61 is disposed towards the top of the bag on the dorsal wall 95 and comprises areas of fasteners 22 intended to make the inflatable balloon integral with the support by means of the fixing means 63 (see FIG. 1*e*) situated on the inflatable balloon. These fixing elements 63 can be T-shaped elements, known under the name of "olives" and the areas of fasteners 22 slots (see FIG. 6*a*) intended to allow these olives to pass. The reinforced area will advantageously be able to be made integral with the support by being fixed on the edging 65 provided in the corner formed by the dorsal wall 95 and the lateral wall 96 of the backpack. This allows one to benefit from the natural structure of a backpack whilst having a very resistant and light system.

There can be either a reinforced area 61 disposed towards the top of the bag on the dorsal wall 95 and comprising areas of fasteners 22 as illustrated in FIG. 6, or else individual fasteners, distributed along the edging towards the top of the backpack, which are attached on or in the conventional edging 65 of the backpack, as described above.

Advantageously, the zip fastener 60 allows the cover 10 containing the inflatable balloon to be fixed on the support by means of the zip fastener 64 of the cover such that once it is fixed, the zip fastener 64 of the cover is open.

The slot 62 through which the inflatable balloon is deployed must be able to open under the pressure performed by the balloon after triggering. This slot can be closed inter alia by an area of the "Velcro" type or a zip fastener having a breaking area defined and calibrated to open in the case of inflation of the balloon.

The access opening 66 can be closed by the opening wall 97 of the backpack by means of a zip fastener 98 at the interface between the opening wall 97 and the lateral wall 96. The fixing device also permits the airbag device 1 to be fixed by beginning by making the airbag integral by means of its fixing element 63 and fastener areas 22, then making the cover 10 integral with the support by means of the fastening means 60 and the closure of the cover 64.

It is preferable to add in addition to the elements complementary to the fixing elements 63 and the zip fastener 64 a supplementary fastener on the support, e.g. provided beneath the site of the cover (e.g. in FIG. 6*b* or 6*c* at the level of the tube 32 on the material of the dorsal wall 95, preferably on a reinforcement of the reinforced area 61 type. This fastener forms the starting point of an additional strap which is then drawn around the cover and fixed above the cover close to the openable slot 62: In fact, the strap for attaching is fixed between the slot 62 and the Velcro or zip closure 60 to further ensure that the opening of the balloon 2 does not occur in the volume of the backpack but towards the support, therefore towards the user's back. This guarantees the functioning if the fasteners 22/63 do not hold or are not properly fixed or if the zip fastener 64 of the cover 10 is not correctly attached to its complementary closure.

The fixing device must ensure that the air bag device, once fixed, can not become detached by itself and that at the moment of inflation the inflatable balloon has no other possibility than to exit through the openable slot 62 provided for this purpose. Once the airbag device is made integral with the support, it only remains to pass the handle 48 and the triggering cable 52 through an opening in the back of the support, allowing the shoulder straps of the support to be reached and allowing the handle to be fixed thereon.

FIG. 7 is an illustration in perspective of a backpack 12 according to an advantageous aspect of the invention comprising a portable airbag system for people according to an embodiment of the invention. The dorsal wall 95 of the backpack 12 is connected to two shoulder straps 18 in a known manner. There is, however, a difference which concerns the fact that above the part of the base strap 105 of the shoulder strap 18 which is attached to a reinforced part of the dorsal wall there is a hole 115 of a sufficient dimension to permit the handle 50 of the triggering arrangement 48 to pass. In FIG. 7, the handle has already passed and is attached by means of a Velcro fastener 130 on the base strap 105 of the shoulder strap 18. It is clear that it is very advantageous that the handle 50 can be turned and stored along the tube 32.

On the base strap 105 of the shoulder strap 18 a cover or cap 125 is mounted, comprising a zip fastener 110 to close it along the shoulder strap 18. This allows the handle to be concealed in situations where the device is not necessarily in the alert or armed position. Of course, the zip fastener 110 can be replaced by buttons or a Velcro strip. It is also possible to provide the system of FIG. 7 on the two shoulder straps 18 or only on the one shoulder strap 18, the left shoulder strap or the right shoulder strap.

It is possible to provide a second slot with a closure 120 in the lower part of the shoulder strap 18 which is then used to only allow the handle to be freed to place it in standby function. It is also possible to only provide a single openable closure toward the bottom and to require the user to push the handle 50 after passage of the opening 115 in a textile tube up to the slot and closure 120.

The fact of providing the storing of the tube along the shoulder strap 18 by passing through a reinforced hole 115 at the junction of shoulder strap 18 and dorsal wall 95 guarantees the serviceability of the device in extreme cases, since the shoulder straps 18 and the dorsal wall 95 always remain close to the user's body, whether it is a backpack or a jacket. The system therefore always remains functional and can be triggered in a certain and safe manner.

The invention claimed is:

1. A portable airbag system for people comprising a support intended to be worn by a user, and an airbag device comprising at least one inflatable bag having at least one central part configured to be disposed behind the head of a user after triggering, wherein the airbag device is assembled in a cover or bag part forming a unit configured to be disposed entirely on the back of a user before deployment, the airbag device being fixed by means of a fixing device in a removable manner and separable from the support, wherein the support comprises a backpack comprising a reinforced area fixed on an edging of the backpack, the reinforced area comprising fasteners configured to be attached in a removable manner to fixing elements integral with the inflatable balloon, or in that the support comprises a backpack comprising an edging and that individual fasteners spaced along the upper part of the edging, configured to be attached in a removable manner to fixing elements integral with the inflatable balloon, are fixed on or in the edging.

2. The airbag system according to claim 1, wherein the fixing elements are in a T-shape and the fasteners are in the form of slots.

3. A portable airbag system for people comprising a support intended to be worn by a user, and an airbag device comprising at least one inflatable bag having at least one central part configured to be disposed behind the head of a user after triggering, wherein the airbag device is assembled in a cover or bag part forming a unit configured to be disposed entirely on the back of a user before deployment, the airbag device being fixed by means of a fixing device in a removable manner and separable from the support, wherein the support is in the form of a backpack, the backpack comprising a slot configured to permit the deployment of the inflatable balloon, this slot being closed by an openable closure under tension of a hook-and-loop or a zip fastener having a breaking area defined and calibrated to open in the case of inflation of the balloon.

4. A portable airbag system for people, comprising a support intended to be worn by a user, and an airbag device comprising at least one inflatable bag having at least one central part configured to be disposed behind the head of a user after triggering, wherein the airbag device is assembled in a cover or bag part forming a unit configured to be disposed entirely on the back of a user before deployment, the airbag device being fixed by means of a fixing device in a removable manner and separable from the support, further comprising a triggering handle device comprising a handle part connected to an interaction element, such as a cable connected to a triggering system of the airbag, the interaction element, for example the cable, being fixed to a pivoting body mounted pivotably to the handle part, the handle device further comprising a locking device configured for locking the handle part in a transverse position to the interaction means, for example the cable.

5. An airbag device for a portable system for people, comprising an inflatable balloon, a gas generator, and a venturi system connectable on the one hand to the gas generator, and on the other hand having an outlet inserted in an opening of the inflatable bag, the venturi system comprising an aspiration part with openings for the passage of exterior air drawn by the venturi system during its deployment, wherein the outlet is in the form of a tube and the opening of the inflatable bag has fabric fixed by a clamping ring around the exterior of the tube, the body of the venturi system being disposed in a manner lying against the surface of the inflatable bag.

6. The airbag system according to claim 5, wherein the outlet is fixed by clamping on a tubular excrescence of the inflatable bag.

7. The airbag device according to claim 5, wherein the venturi system has a longitudinal shape, the longitudinal axis being disposed essentially parallel to the surface of the part of the bag on which the venturi system is mounted, where preferably the venturi system is covered by a net fixed to the inflatable bag, and where the net comprises opening and closing means from the group comprising a zip fastener or Velcro, permitting access to the venturi system.

8. The airbag device according to claim 7, wherein the venturi system is disposed on a central part of the inflatable bag configured to be disposed behind the head of the user during the deployment and on a lower part of the central part such that the venturi system is protected from shocks.

9. The airbag device according to claim 5, wherein the nozzle of the venturi system also plays the role of a link between the venturi system and the high pressure flexible tube whilst permitting a rotation around its longitudinal axis.

10. An airbag device for a portable system for people, comprising an inflatable bag, a gas generator, a triggering system, and a triggering handle device comprising a handle part connected to an interaction element, connected to the triggering system, the interaction element being fixed to a pivoting body pivotably mounted to the handle part, the handle device further comprising a locking device configured to lock the handle part in a transverse position to the interaction element.

11. The airbag device according to claim 10, wherein the interaction element is a cable and wherein the handle device comprises a tube extending from the pivotable body a certain length around the cable.

12. An airbag device for a portable system for people, comprising an inflatable bag, a gas generator, and a triggering device for triggering the gas generator, the triggering device comprising a triggering point with a spring or pushing the point, the spring being in compression before triggering and retained by a trigger element, the trigger element comprising a retention member engaged in a removable blocking element, the blocking element being retained by the retention member in a position permitting a gas generator to be mounted to the triggering device, and when the trigger element has been moved to a deployment position, the retention member releases the blocking element which is configured to be moved in a position blocking the assembly of the gas generator to the triggering device.

13. The air bag device according to claim 12, wherein the triggering device comprises a metallic body with two parallel chambers permitting the interaction of the trigger element between a cable, a triggering arrangement by a ball and a blocking element such that the trigger element which is connected to the cable permits at an upper position the triggering of the triggering arrangement by the ball and at a lower position permits the blocking element to be maintained in a withdrawal position.

14. The airbag device according to claim 13, comprising a cover ensuring several functions including the fixing of a tube, the fixing of a high pressure flexible tube, and the closure of a metallic body which ensures the compression of the spring.

15. The airbag device according to claim 14, wherein the trigger element ensures alone the fixing of the cable, the retaining of the ball and the determining of the force necessary for the triggering of the mechanism by means of an inclined plane in contact with the ball.

16. An airbag device for a portable system for people, comprising an inflatable bag, a gas generator, and a triggering device for the triggering of the gas generator, the triggering device comprising a triggering point with a spring for pushing the point, the spring being in compression before triggering and retained by a trigger element, the triggering point comprising lateral passages configured to prevent a jack effect during the percussion of the gas generator.

17. A support intended to be worn by a user for a portable airbag system for people, in the form of a backpack or jacket comprising a reinforced area fixed on an edging of a part of the back of the backpack or of the jacket so as to use the naturally reinforced areas of a backpack or of a jacket, the reinforced area comprising fasteners configured to be attached in a removable manner to fixing elements integral with the inflatable balloon of the said airbag system, permitting the use of the backpack or of the jacket with or without the airbag system by the end user or in the form of a backpack or jacket comprising an edging, and that at least two or four individual fasteners, spaced along the edging, preferably along the upper part and/or lower part of the edging, configured to be attached in a removable manner to fixing elements integral with the inflatable balloon and/or the cover of the airbag system, are fixed on or in the edging permitting the use of the backpack with or without the airbag system by the end user, wherein the fixing elements are in a T-shape and the fasteners are in the form of slots.

18. The support intended to be worn by a user for a portable airbag system for people according to claim 17, wherein the backpack comprises a slot configured to permit the deployment of the inflatable balloon, this slot being closed by an openable closure under tension of a hook-and-loop or a zip fastener having a breaking area defined and calibrated to open in the case of inflation of the balloon.

* * * * *